(12) United States Patent
Yuki

(10) Patent No.: US 8,885,210 B2
(45) Date of Patent: Nov. 11, 2014

(54) IMAGE FORMING APPARATUS AND CONTROL METHOD THEREOF

(71) Applicant: Canon Kabushiki Kaisha, Tokyo (JP)

(72) Inventor: Naoto Yuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/148,243

(22) Filed: Jan. 6, 2014

(65) Prior Publication Data

US 2014/0211218 A1    Jul. 31, 2014

(30) Foreign Application Priority Data

Jan. 28, 2013   (JP) ................................ 2013-013321

(51) Int. Cl.
*G06F 15/00* (2006.01)
*G06K 1/00* (2006.01)
*G06K 15/00* (2006.01)
*H04N 1/00* (2006.01)
*H04N 1/23* (2006.01)

(52) U.S. Cl.
CPC ......... *H04N 1/2376* (2013.01); *H04N 1/00278* (2013.01)
USPC .......................................... 358/1.5; 358/1.13

(58) Field of Classification Search
CPC . H04N 1/00278; H04N 1/2376; G06K 15/00; G06F 3/1296
USPC ....................................... 358/1.1, 1.15, 1.13
See application file for complete search history.

(56) References Cited

U.S. PATENT DOCUMENTS

2009/0094135 A1* 4/2009 Synder ............................. 705/26
2010/0309513 A1* 12/2010 Aizawa et al. ................ 358/1.15

FOREIGN PATENT DOCUMENTS

JP          2011-180902 A        9/2011

* cited by examiner

*Primary Examiner* — Douglas Tran
(74) *Attorney, Agent, or Firm* — Canon U.S.A., Inc. IP Division

(57) ABSTRACT

When a license for setting a continuous copying speed of an image forming apparatus is installed in the image forming apparatus, a continuous copying speed identified from the license is set as the continuous copying speed of the image forming apparatus.

16 Claims, 27 Drawing Sheets

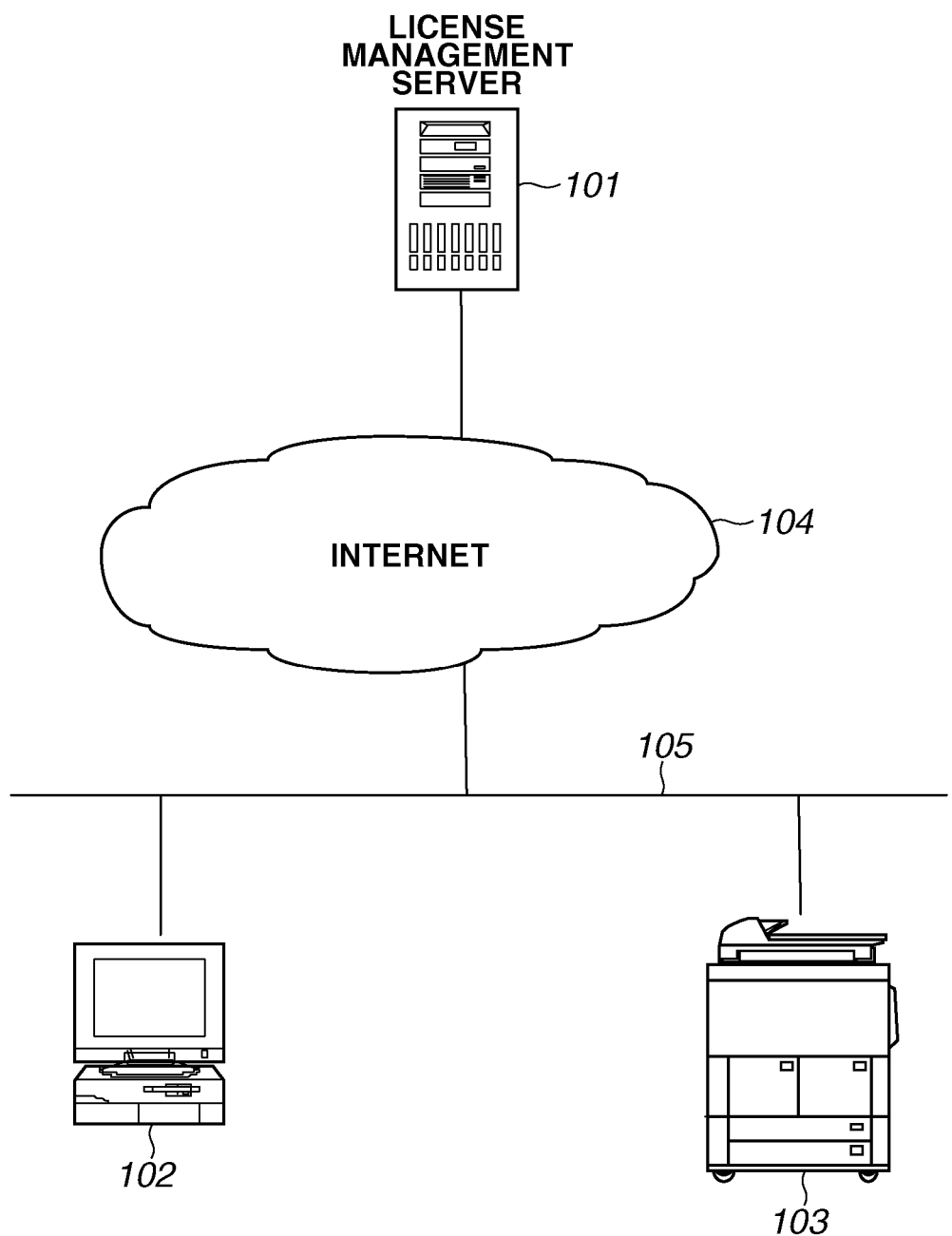

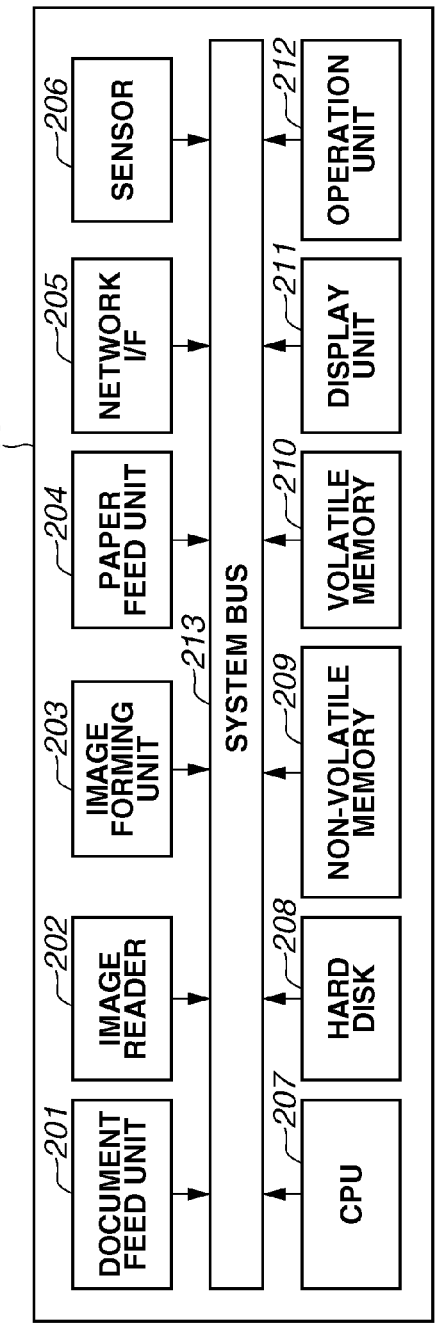
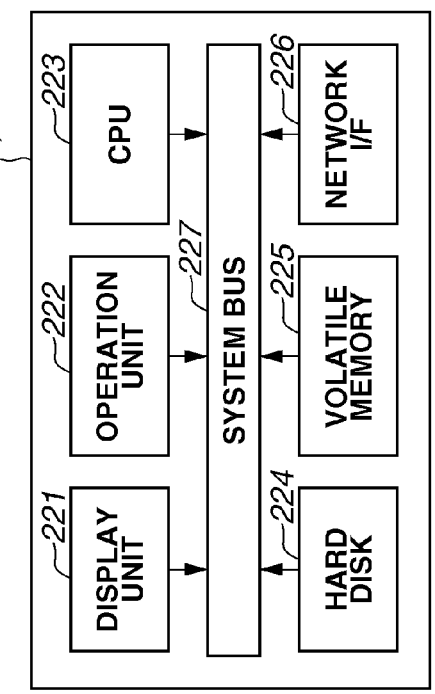

FIG.5A

| PRODUCT ID | PRODUCT NAME | TYPE | FUNCTION ID |
|---|---|---|---|
| P001 | SEND | OPTION | F001 |
| P002 | VNC | OPTION | F002 |
| P003 | CONTINUOUS COPYING SPEED (70PPM) | PPM | F003 |
| P004 | CONTINUOUS COPYING SPEED (60PPM) | PPM | F004 |
| P005 | CONTINUOUS COPYING SPEED (50PPM) | PPM | F005 |
| P006 | CONTINUOUS COPYING SPEED (40PPM) | PPM | F006 |
| P007 | CONTINUOUS COPYING SPEED (30PPM) | PPM | F007 |

FIG.5B

| LICENSE NUMBER | PRODUCT ID | LICENSE-ISSUED DEVICE NUMBER | LICENSE ID |
|---|---|---|---|
| 1f34-ab42-5785 | P003 | | |
| aba3-ff13-34aa | P001 | | |
| 9ab9-240c-14de | P002 | | |

FIG.5C

| DEVICE PRODUCT ID | PRODUCT NAME | PPM SETTING | MODEL NUMBER | RANGE |
|---|---|---|---|---|
| D001 | DEV239 | NECESSARY | AAA | 00000-99999 |
| D002 | DEV239A(70PPM) | UNNECESSARY | BBB | 00000-99999 |
| D003 | DEV239B(60PPM) | UNNECESSARY | CCC | 00000-99999 |
| D004 | DEV239C(50PPM) | UNNECESSARY | DDD | 00000-99999 |
| D005 | DEV211A(40PPM) | UNNECESSARY | EEE | 00000-99999 |
| D006 | DEV211B(30PPM) | UNNECESSARY | FFF | 00000-99999 |
| D007 | DEV211C(20PPM) | ARBITRARY | GGG | 00000-99999 |
| D008 | DEV703 | NECESSARY | HHH | 00000-99999 |

FIG.7A
LICENSE ISSUE SCREEN — 701

INPUT LICENSE NUMBER AND DEVICE NUMBER, AND CLICK [ISSUE] BUTTON.

| | |
|---|---|
| LICENSE NUMBER | 1. _____ — 702 <br> 2. _____ <br> 3. _____ <br> 4. _____ |
| DEVICE NUMBER | _____ — 703 |

704 — [ISSUE]

FIG.7B
LICENSE ISSUE COMPLETION SCREEN — 711

LICENSE HAS BEEN ISSUED.
CLICK [DOWNLOAD LICENSE] AND DOWNLOAD LICENSE.

DOWNLOAD LICENSE — 712

FIG.7C
LICENSE TRANSFER SCREEN — 721

INPUT INVALIDATED LICENSE AND TRANSFER DESTINATION DEVICE NUMBER, AND CLICK [ISSUE] BUTTON.

| | |
|---|---|
| INVALIDATED LICENSE | 1. _____ [REFERENCE] — 722 <br> 2. _____ [REFERENCE] <br> 3. _____ [REFERENCE] <br> 4. _____ [REFERENCE] |
| TRANSFER DESTINATION DEVICE NUMBER | _____ — 723 |

724 — [ISSUE]

FIG.7D
LICENSE NUMBER ADDITION SCREEN — 731

CONTINUOUS COPYING SPEED SETTING LICENSE HAS NOT BEEN ISSUED TO THE INPUT DEVICE NUMBER.
TO CONTINUE, INPUT LICENSE NUMBER AND CLICK [ISSUE] BUTTON.

| | |
|---|---|
| LICENSE NUMBER | _____ — 732 |

733 — [ISSUE]

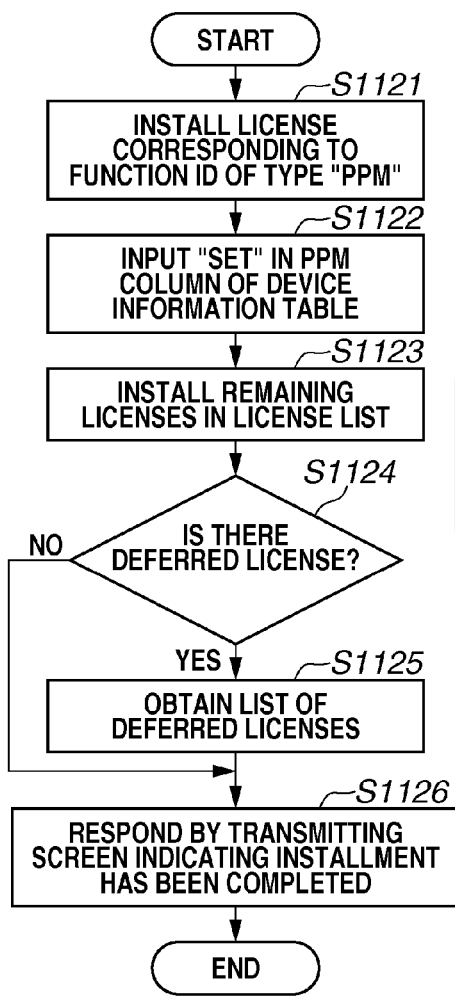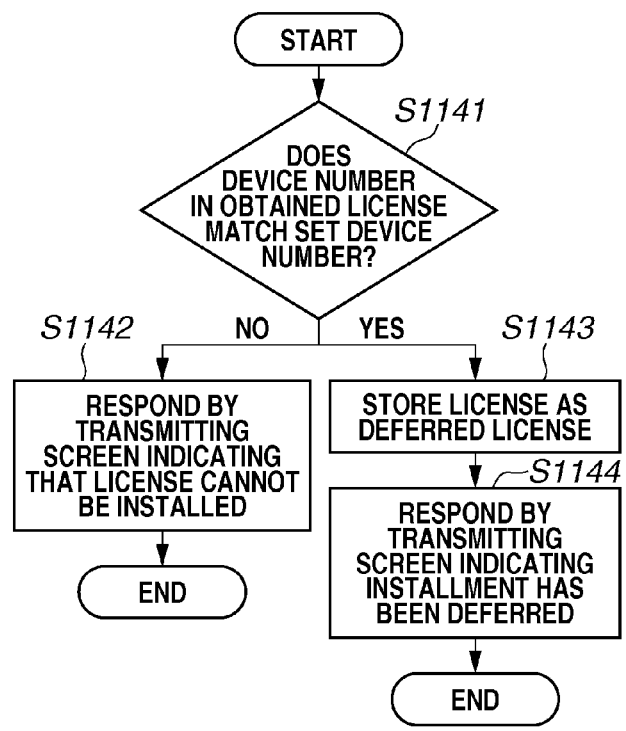
FIG.11B
FIG.11C

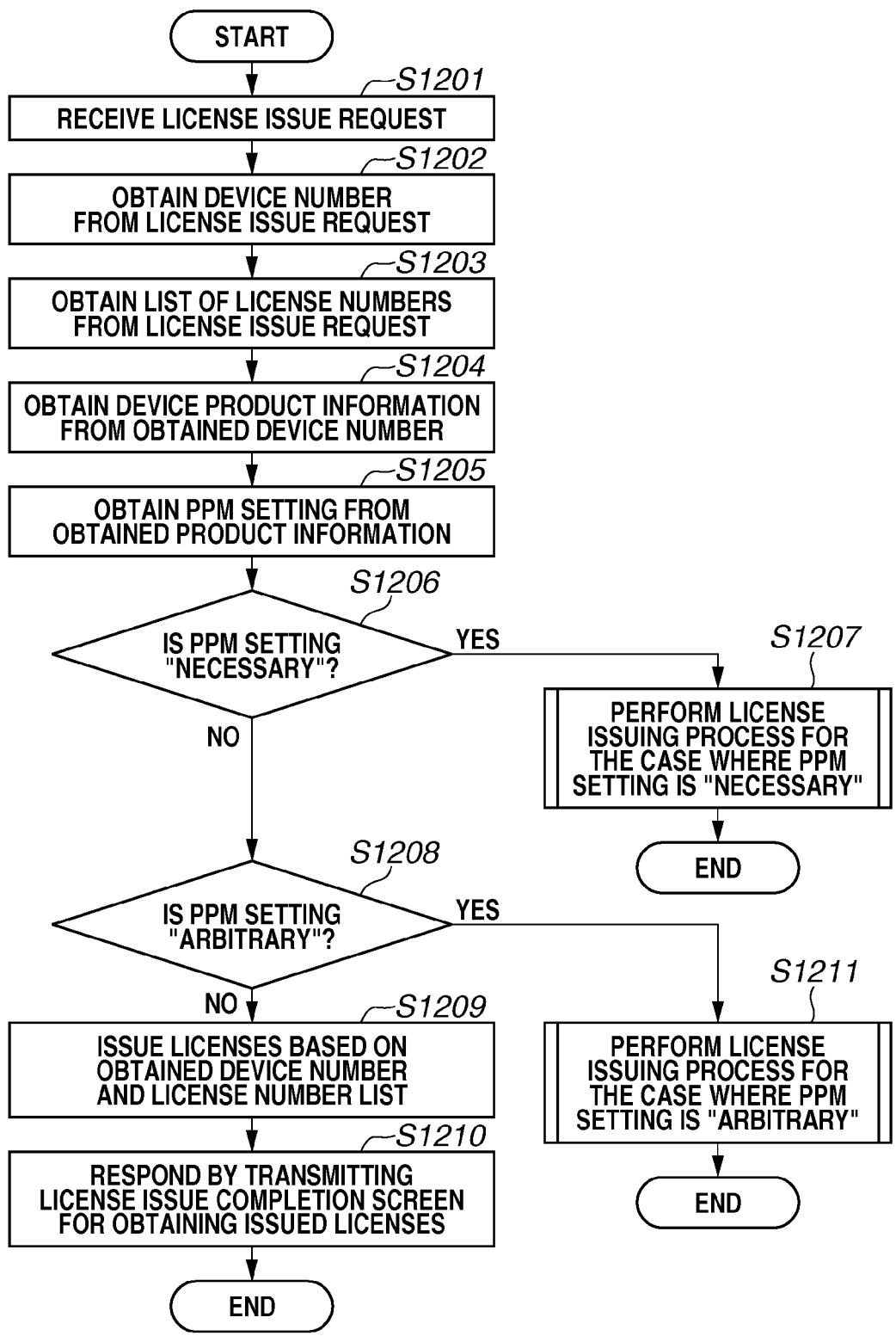

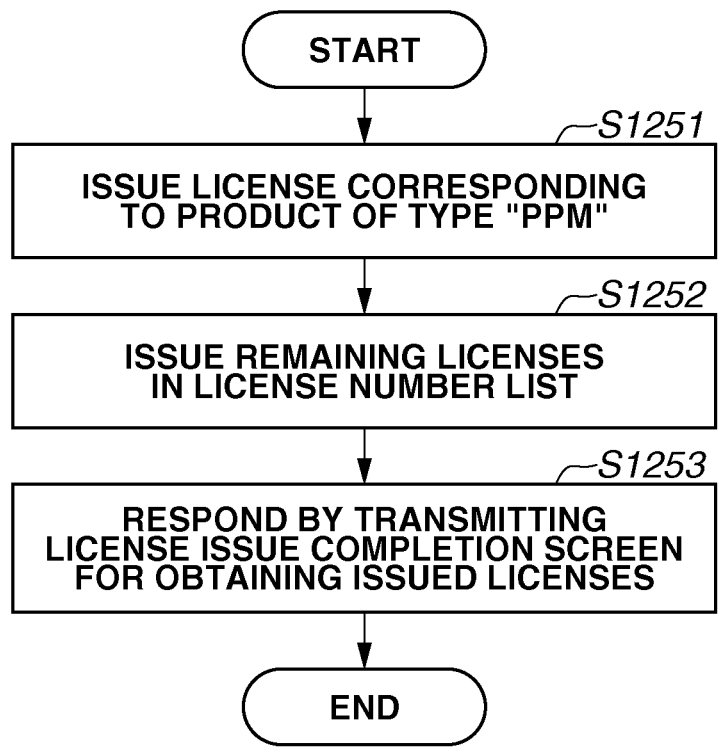

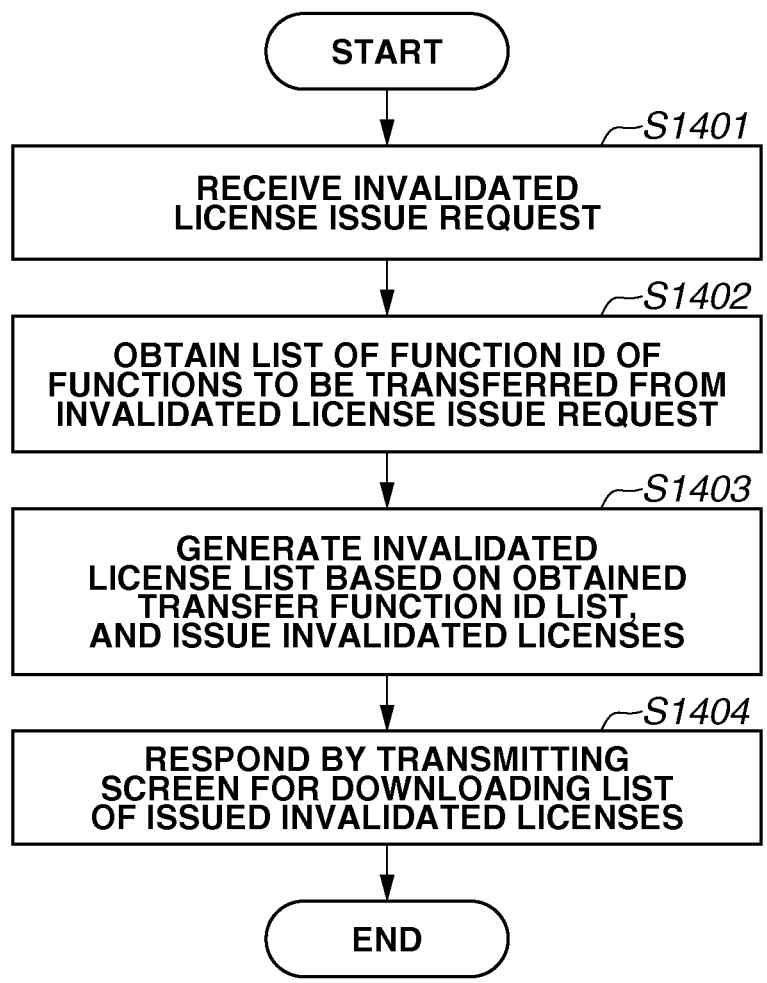

FIG.19

| FUNCTION ID | ORIGINAL MODEL NUMBER | NEW MODEL NUMBER |
|---|---|---|
| F003 | AAA | BBB |
| F004 | AAA | CCC |
| F005 | AAA | DDD |
| F006 | GGG | EEE |
| F007 | GGG | FFF |

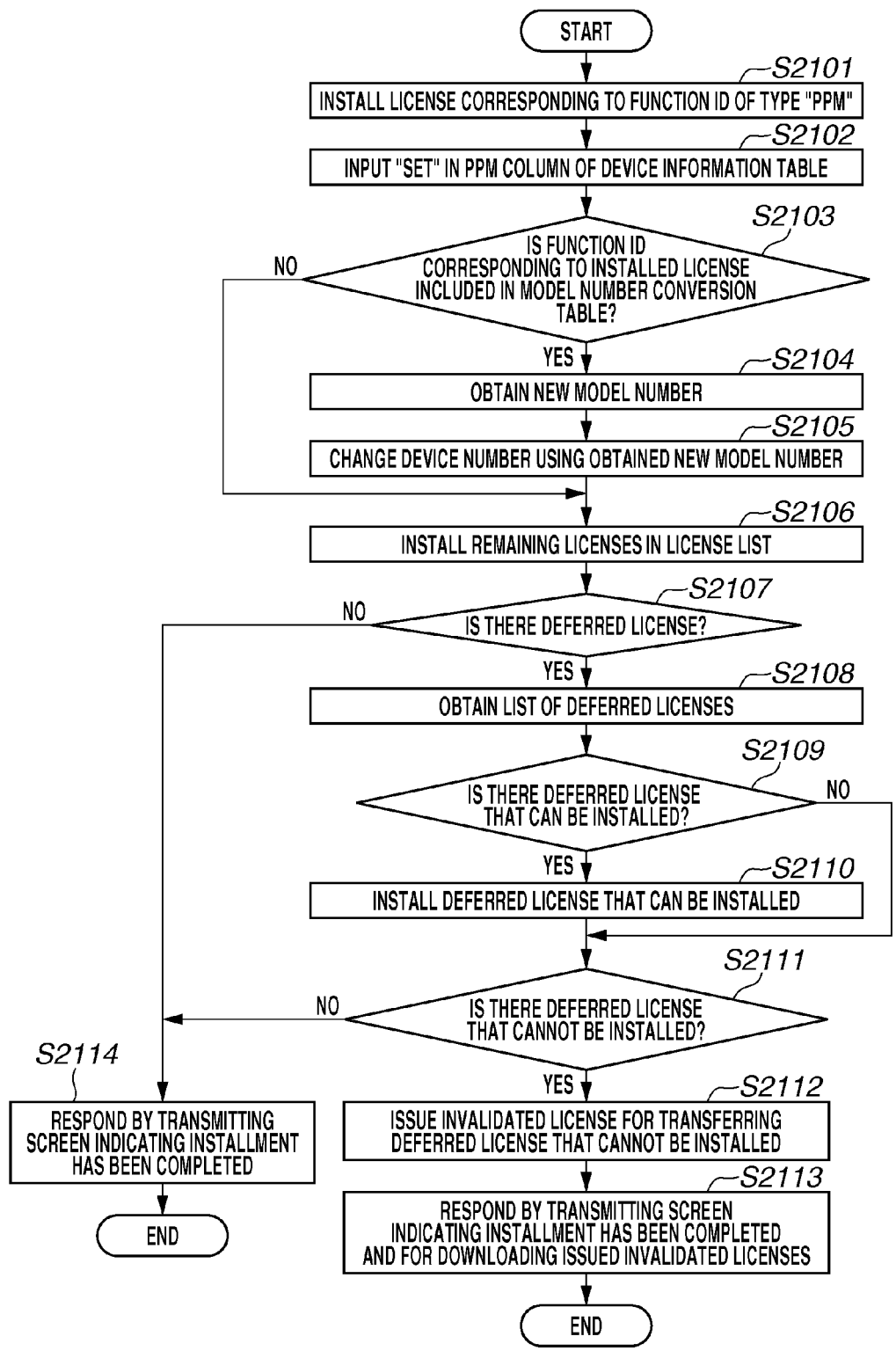

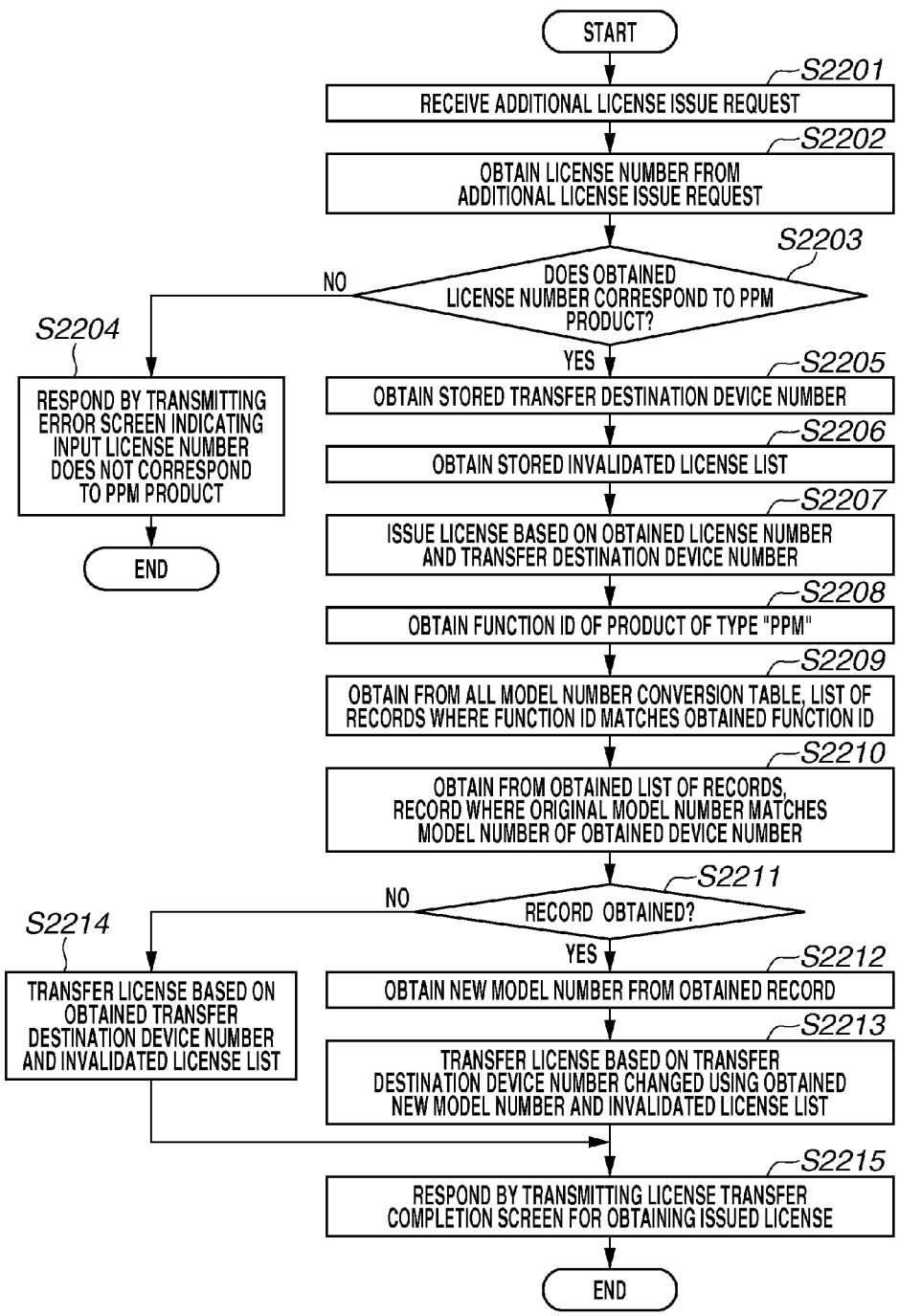

IMAGE FORMING APPARATUS AND CONTROL METHOD THEREOF

BACKGROUND OF THE INVENTION

1. Field of the Invention

The present invention relates to an image forming apparatus which makes a specific function corresponding to an input license usable, and a control method thereof.

2. Description of the Related Art

Conventionally, when an image forming apparatus is shipped from a manufacturing plant, basic functions of the image forming apparatus, a device number for uniquely identifying the image forming apparatus, and a continuous copying speed (in units of pages per minute, i.e., PPM) are set to the image forming apparatus. Further, a user purchasing the image forming apparatus may customize the image forming apparatus by adding extension functions to the basic functions to meet the user's needs. The extension functions generally require payment, and an improper use thereof is prevented by way of a license. Japanese Patent Application Laid-Open No. 2011-180902 discusses a method of preventing the improper use employing the license as follows. The license is managed by associating the license with the device number so that a same license cannot be used in other image forming apparatus.

If the continuous copying speed is set to the image forming apparatus at the time of factory shipment as described above, there may arise inventories with respect to a product set to a specific continuous copying speed. To solve such a problem, it is necessary to cause the user to set the continuous copying speed at the time of purchase using the license for setting the continuous copying speed, instead of setting the continuous copying speed at the time of factory shipment. However, Japanese Patent Application Laid-Open No. 2011-180902 does not discuss such a method for setting the continuous copying speed.

SUMMARY OF THE INVENTION

The present invention is directed to providing an image forming apparatus in which the continuous copying speed identified by the license for setting the continuous copying speed of the image forming apparatus is set as the continuous copying speed of the image forming apparatus, when the license is installed.

According to an aspect of the present invention, an image forming apparatus, which makes a specific function corresponding to a license usable input thereto, includes an installing means configured to install a license for setting a continuous copying speed of the image forming apparatus, a setting means configured to set as a continuous copying speed of the image forming apparatus, a continuous copying speed specified by the license when the installing means installs the license, and a control means configured to not permit, in the case where the setting means has not set a continuous copying speed, the image forming apparatus to be activated, and permit, in the case where the setting means has set a continuous copying speed, the image forming apparatus to be activated.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates a network configuration.

FIGS. 2A and 2B illustrate hardware configurations.

FIGS. 5A, 5B, and 5C illustrate examples of tables stored in a license management server.

FIGS. 7A, 7B, 7C, and 7D illustrate examples of screens provided by the license management server.

FIGS. 11A, 11B, and 11C are flowcharts illustrating license installing processes according to the first exemplary embodiment.

FIGS. 12A, 12B, and 12C are flowcharts illustrating license issuing processes according to a second exemplary embodiment of the present invention.

FIG. 14 is a flowchart illustrating a license invalidation process according to the third exemplary embodiment.

FIG. 19 illustrates an example of a table stored in the license management server according to the fourth exemplary embodiment.

FIGS. 21A and 21B are flowcharts illustrating license installing processes according to the fourth exemplary embodiment.

FIG. 22 is a flowchart illustrating a process for issuing an additional license when transferring the license according to the fourth exemplary embodiment.

DESCRIPTION OF THE EMBODIMENTS

Figure 3A:
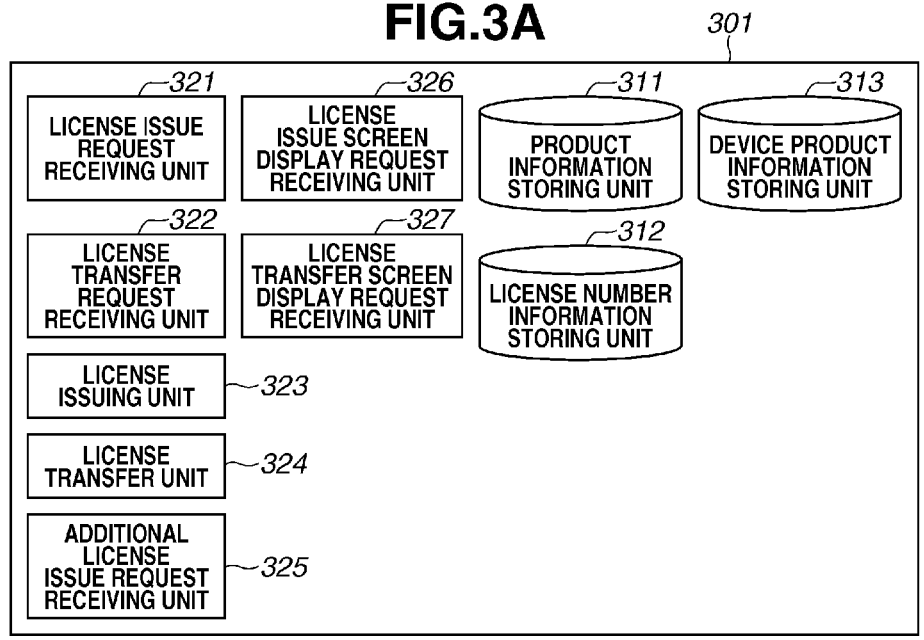
FIGS. 3A and 3B illustrate software configurations.

Various exemplary embodiments, features, and aspects of the invention will be described in detail below with reference to the drawings.

Terms according to the present invention will be defined below.

The basic functions are functions included in the purchased image forming apparatus which are usable as standard functions. Examples of the basic functions are a scan function and a copy function. The extension functions are the functions which are not included in the image forming apparatus as the standard functions and are installed after the image forming apparatus has been manufactured. Examples of the extension functions are a send function of transmitting a scanned image to an information processing apparatus by e-mail, and a virtual network computing (VNC) function which allows remote control of the image forming apparatus. The extension functions are thus added to the basic functions of the image forming apparatus. The continuous copying speed is the number of sheets which can be continuously copied in one minute. The continuous copying speed of a multifunction peripheral capable of copying 60 sheets in one minute is 60 PPM.

A product is a unit traded in the market for using the function such as the extension function and the continuous copying speed. A license management server 101 (to be described in detail below) illustrated in FIG. 1 at least stores information to be described below as the information on the product. The license management server 101 stores product identification (ID), i.e., an identifier for uniquely identifying the product. Further, the license management server 101 stores function ID, i.e., an identifier for uniquely identifying a specific function among the functions such as the extension functions and the continuous copying speed. For example, the function ID "F001" is an identifier indicating the send function, i.e., an extension function, and the function ID "F0003" is an identifier indicating the continuous copying speed of 70 PPM.

A license number is a unique identifier issued by the license management server 101 for each product purchased by the user. A device number is an identifier for uniquely identifying an image forming apparatus 103 (to be described in detail below) illustrated in FIG. 1.

A license which is necessary for using the extension functions and setting the continuous copying speed of the image forming apparatus 103 at least contains the following information. The license contains license ID, i.e., an identifier for uniquely identifying the license. Further, the license contains the function ID, i.e., an identifier for uniquely identifying the function such as the extension function and the continuous copying speed function which becomes usable by the license. Furthermore, the license contains the device number of the image forming apparatus 103 which can use the license. If a license issue request including the license number and the device number is transmitted to the license management server 101, the license management server 101 issues the license. The image forming apparatus 103 then installs the issued license.

A device product is a product provided for each model of the image forming apparatus registered in the license management server 101. The license management server 101 at least stores the following information as the information on the device product. The license management server 101 stores device product ID, i.e., an identifier for uniquely identifying the device product. Further, the license management server 101 stores continuous copying speed setting information, i.e., the information on whether it is necessary, unnecessary, or arbitrary to set the continuous copying speed to the device product based on the license. Furthermore, the license management server 101 stores a range of the device number belonging to the device product. For example, if a device number AAA00000 to a device number AAA99999 are to be manufactured as one type of the image forming apparatus, AAA00000 to AAA99999 are registered for one device product as the range of the device number.

According to a first exemplary embodiment, a method for setting, by using the license, the continuous copying speed of the image forming apparatus after factory shipment will be described below. FIG. 1 illustrates a system configuration of a license management system according to the present invention. Referring to FIG. 1, the image forming apparatus 103 and the information processing apparatus 102 are connected via a LAN 105. The LAN 105 is connectable to the Internet 104, and the license management server 101 is connected to the Internet 104. In the example illustrated in FIG. 1, one image forming apparatus 103 and an information processing apparatus 102 are connected. However, an arbitrary number of the respective apparatuses may be connected.

FIGS. 2A and 2B illustrate the hardware configurations. FIG. 2A illustrates the hardware configuration of the image forming apparatus 103 constituted by following units 201 to 213. Referring to FIG. 2A, a document feed unit 201 automatically transmits to an image reader 202 a document to be read. The image reader (i.e., a scanner) 202 then reads the document. An image forming unit 203 converts the read document and the received data to a print image and prints the print image. A paper feed unit 204 feeds the paper for printing. A network interface (I/F) 205 connects to the LAN and the Internet via the network and exchanges information with external devices. A sensor 206 detects a status of each portion in the image forming apparatus 103. A central processing unit (CPU) 207 controls each process performed in the image forming apparatus 103. A hard disk 208 stores programs and the data related to each process performed in the image forming apparatus 103. A non-volatile memory 209 is a rewritable memory which can store data without a power supply. A volatile memory 210 is a rewritable memory which electrically stores temporary data related to each process performed in the image forming apparatus 103. A display unit 211 displays an operation status of the image forming apparatus 103 and information on operations performed with respect to an operation unit 212. The operation unit 212 receives instructions input to the image forming apparatus 103. A system bus 213 connects each of the units 201 to 212 and performs data exchange.

FIG. 2B illustrates the hardware configuration of the information processing apparatus 102 and the license management server 101 constituted by following units 221 to 227. Referring to FIG. 2B, a display unit 221 displays a window, icons, messages, menus, and other types of user interface information. An operation unit 222 receives the input from an end user using a keyboard and a mouse.

A CPU 223 controls each process performed by the information processing apparatus 102 and the license management server 101. A hard disk 224 stores the programs and the data related to each process performed by the information processing apparatus 102 and the license management server 101. A volatile memory 225 is a rewritable memory which electrically stores the temporary data related to each process performed in the information processing apparatus 102 and the license management server 101. A network I/F 226 connects to the LAN and the Internet via the network and exchanges information with the external devices. A system bus 227 connects each of the units 221 to 226 and performs data exchange.

Figure 3B:
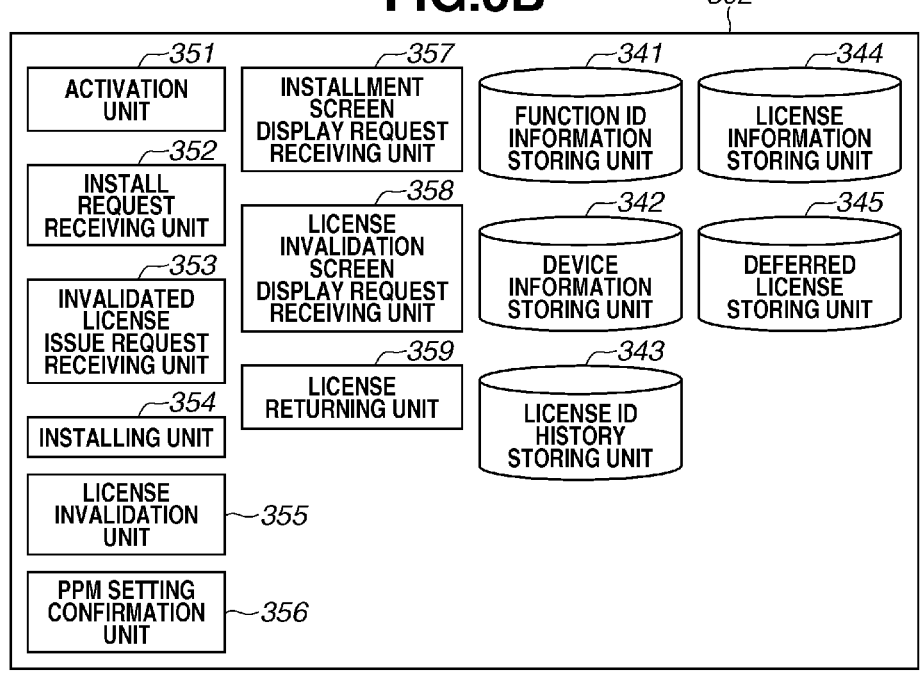

FIGS. 3A and 3B illustrate the software configurations. FIG. 3A illustrates the software configuration 301 of the license management server 101. Each of the units in the software configuration 301 is realized by the CPU 223 loading to the volatile memory 225 the programs stored in the hard disk 224 of the license management server 101.

Referring to FIG. 3A, a product information storing unit 311 stores in the hard disk 224 of the license management server 101 a product information table 501 illustrated in FIG. 5A to be described below. A license number information storing unit 312 stores in the hard disk 224 of the license management server 101 a license number information table 511 illustrated in FIG. 5B to be described below. A device product information storing unit 313 stores in the hard disk 224 of the license management server 101 a device product information table 521 illustrated in FIG. 5C to be described below.

Figure 8A:
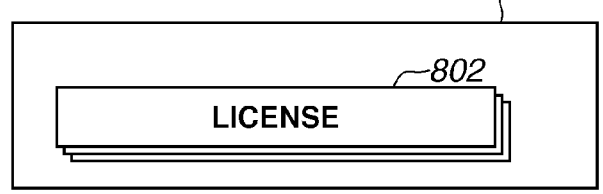
FIGS. 8A, 8B, 8C, 8D, and 8E illustrate examples of data exchanged via a local area network (LAN) and the Internet.
Figure 8B:
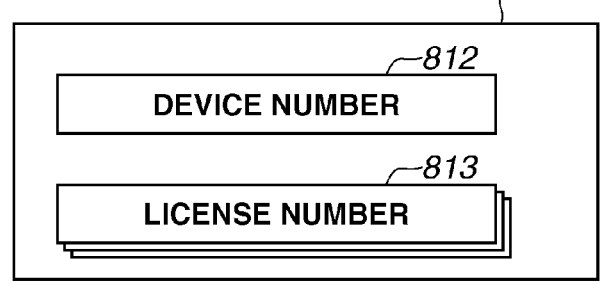

A license issue request receiving unit 321 receives via the network I/F 226 in the license management server 101 a license issue request 811 illustrated in FIG. 8B. A license transfer request receiving unit 322 receives via the network I/F 226 in the license management server 101 a license transfer request 831 illustrated in FIG. 8D.

Figure 9A:
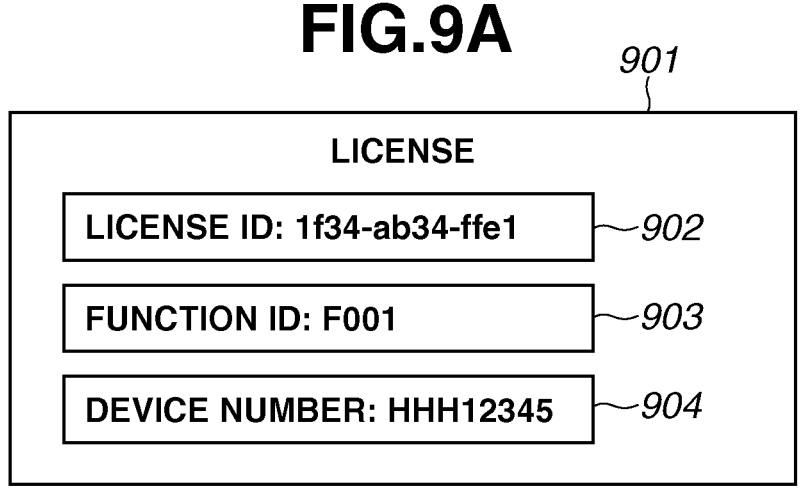
FIGS. 9A and 9B illustrate examples of the licenses.

A license issuing unit 323 issues a license 901 illustrated in FIG. 9A for using the extension functions. If the license is to be issued using the license issuing unit 323, the license number, which is issued as a unique value for each purchased product, and the device number, which uniquely identifies the image forming apparatus which installs the license, are required as input values.

The license issuing unit 323 then issues the license 901 which includes the function ID identified from the input license number, the input device number, and the license ID which uniquely identifies the license. Upon issuing the license, the license issuing unit 323 stores the device number and the license ID in the license number information table 511. More specifically, the license issuing unit 323 respectively stores the device number and the license ID in a license-issued device number column 514 and a license ID column 515 of a record of the license number information which includes the input license number.

A license transfer unit 324 allows the license issued with respect to an image forming apparatus to be used in other image forming apparatus. If the license is to be transferred using the license transfer unit 324, the followings become necessary as the input values. An invalidated license 911 illustrated in FIG. 9B which indicates that the extension functions have been invalidated, and the device number of the image forming apparatus which is the transfer destination of the license, become necessary and need to be obtained from the image forming apparatus to which the license has been issued. The license transfer unit 324 then issues the license 901 which includes the function ID identified from the input invalidated license 911, the input transfer destination device number, and the license ID which uniquely identifies the license. Upon issuing the license 901, the license transfer unit 324 stores the transfer destination device number and the license ID in the license number information table 511. More specifically, the license transfer unit 324 respectively stores the transfer destination device number and the license ID in the license-issued device number column 514 and the license ID column 515 of the record of the license number information identified from the invalidated license 911. An additional license issue request receiving unit 325 receives via the network I/F 226 in the license management server 101 an additional license issue request 841 illustrated in FIG. 8E.

FIG. 3B illustrates a software configuration 302 of the image forming apparatus 103. Each of the units in the software configuration 302 is realized by the CPU 207 in the image forming apparatus 103 loading to the volatile memory 210 the programs stored in the hard disk 208 of the image forming apparatus 103.

Referring to FIG. 3B, a function ID information storing unit 341 stores in the hard disk 208 of the image forming apparatus 103 a function ID information table 401 illustrated in FIG. 4A to be described below. A device information storing unit 342 stores in the hard disk 208 of the image forming apparatus 103 a device information table 411 illustrated in FIG. 4B to be described below. A license ID history storing unit 343 stores in the hard disk 208 of the image forming apparatus 103 a license ID history table 421 illustrated in FIG. 4C to be described below. A license information storing unit 344 stores in the hard disk 208 of the image forming apparatus 103 a license information table 431 illustrated in FIG. 4D to be described below. A deferred license storing unit 345 stores in the hard disk 208 of the image forming apparatus 103 a deferred license table 441 illustrated in FIG. 4E to be described below.

An activation unit 351 is activated when the image forming apparatus 103 is switched on. The activation unit 351 checks the license information table 431 and makes the extension functions corresponding to the function ID in the existing records usable.

An install request receiving unit 352 receives via the network I/F 205 in the image forming apparatus 103 an install request 801 illustrated in FIG. 8A. A transfer request receiving unit 353 receives via the network I/F 205 in the image forming apparatus 103 the transfer request 821.

An installing unit 354 allows the extension functions to be used by way of the license 901. The installing unit 354 uses the license 901 as the input value and checks whether a device number 904 in the input license 901 matches the value in a device number column 412 of the device information table 411. If the values match, the installing unit 354 performs the installing process. If the installment is successful, the installing unit 354 adds to a license ID history table 421 illustrated in FIG. 4C the record which stores license ID 902 of the license 901. Further, the installing unit 354 adds to the license information table 431 the record which respectively stores function ID 903 and the license ID 902 in a function ID column 432 and a license ID column 433.

A license invalidation unit 355 restores the usable extension functions to an unusable state, and issues the invalidated license 911. The license invalidation unit 355 uses the function ID as the input value, and obtains as the output value the invalidated license 911 which is issued by invalidating the function corresponding to the input function ID. If the license invalidation is successful, the license invalidation unit 355 deletes from the license information table 431 the record of the corresponding function ID. A PPM setting confirmation unit 356 is a function called by the activation unit 351, and determines whether the continuous copying speed is set.

When an installment screen display request is received via the network I/F 205 in the image forming apparatus 103, an installment screen display request receiving unit 357 returns to an installment screen 601 illustrated in FIG. 6A, which will be described below, as a response. When a license invalidation screen display request is received via the network I/F 205 in the image forming apparatus 103, a license invalidation screen display request receiving unit 358 returns to a license invalidation screen 621 illustrated in FIG. 6D, which will be described below, as a response. A license returning unit 359 issues the invalidated license 911 for returning the unusable license. The license returning unit 359 uses the license as the input value and obtains the invalidated license 911 generated from the input license information as the output value.

Figure 4A:
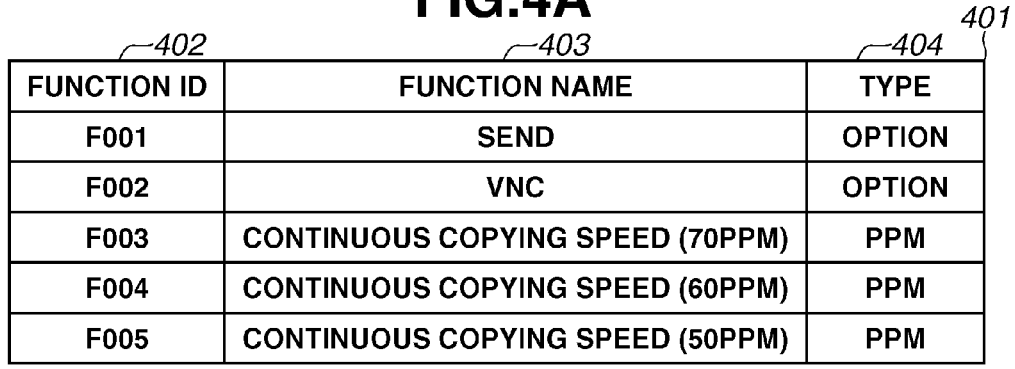
FIGS. 4A, 4B, 4C, 4D, and 4E illustrate examples of tables stored in the image forming apparatus.

FIGS. 4A, 4B, 4C, 4D, and 4E illustrate examples of the tables stored in the hard disk 208 of the image forming apparatus 103. FIG. 4A illustrates the function ID information table 401. The records in the function ID information table 401 are previously set as master data at the time of factory shipment. Referring to FIG. 4A, a function ID column 402 stores the function ID for uniquely identifying the function. A function name column 403 stores the function name corresponding to the function ID. A type column 404 stores the type of the function ID. If the function ID corresponds to the function of setting the continuous copying speed, a value "PPM" is stored in the type column 404, and if the function ID corresponds to the extension function which becomes usable, the value "OPTION" is stored in the type column 404. The function ID column 402 is a main key in the function ID information table 401, and the records can be uniquely identified thereby.

Figure 4B:
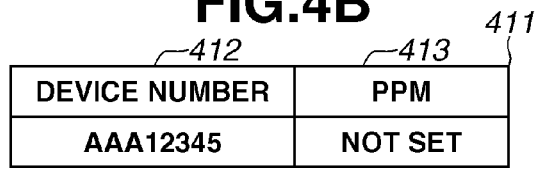

FIG. 4B illustrates the device information table 411. Referring to FIG. 4B, the device number column 412 stores the device number for uniquely identifying the image forming apparatus 103, which is set at the time of factory shipment without an overlap between the devices. A PPM column 413 stores information on whether the continuous copying speed is set to the image forming apparatus 103. If the continuous copying speed is not set, "not set" is stored in the PPM column 413, and if the continuous copying speed is set, "set" is stored in the PPM column 413. When the image forming apparatus 103 is shipped from the factory, either the value "not set" or "set" is stored in the PPM column 413.

Figure 4C:
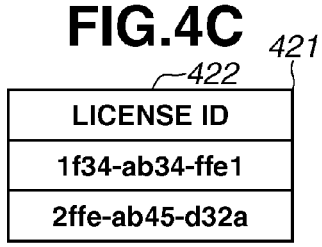

FIG. 4C illustrates the license ID history table 421. There are no records in the license ID history table 421 at the time of factory shipment. Referring to FIG. 4C, a license ID column 422 stores the license ID of the license which has been installed in the image forming apparatus 103.

Figure 4D:
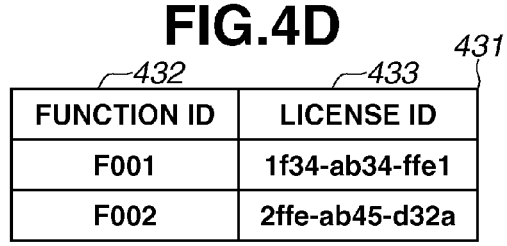

FIG. 4D illustrates the license information table 431. There are no records in the license information table 431 at the time of factory shipment. Referring to FIG. 4D, the function ID column 432 stores the function ID of the function which has become usable in the current image forming apparatus 103. The license ID column 433 stores the license ID of the license which has been installed so that the specific function becomes usable in the image forming apparatus 103. The function ID column 432 is the main key in the license information table 431, and the records can be uniquely identified thereby.

Figure 4E:
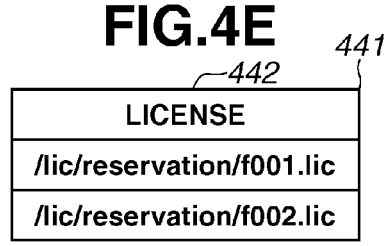

FIG. 4E illustrates the deferred license table 441. There are no records in the deferred license table 441 at the time of factory shipment. Referring to FIG. 4E, a license column 442 stores an absolute path of the deferred license stored in the hard disk 208 of the image forming apparatus 103. If a license which causes the extension function to be usable is installed in the image forming apparatus in the state where the license for setting the continuous copying speed is not installed, the license is stored as the deferred license. In other words, as far as the continuous copying speed is not set, a portion of the basic functions of the image forming apparatus cannot be used, so that the user is prevented from using the extension function.

FIGS. 5A, 5B, and 5C illustrate the tables stored in the hard disk 224 of the license management server 101. FIG. 5A illustrates the product information table 501. When a new extension function is to be marketed, the record thereof is additionally registered in the product information table 501. Referring to FIG. 5A, a product ID column 502 stores the product ID for uniquely identifying the product. A product name column 503 stores the product name corresponding to the product ID. A type column 504 stores the type of the function corresponding to the function ID. If the function corresponding to the function ID is a function of setting the continuous copying speed, a value "PPM" is stored in the type column 504. Further, if the function corresponding to the function ID is the extension function to become usable, the value "OPTION" is stored in the type column 504. A function ID column 505 stores the function ID. The function ID column 505 is the main key in the product information table 501, and the records can be uniquely identified thereby.

FIG. 5B illustrates the license number information table 511. Referring to FIG. 5B, a license number column 512 stores the license number which is a unique number issued for each purchased product. A product ID column 513 stores the product ID of the purchased product. The license-issued device number column 514 stores the device number of the image forming apparatus 103 to which the license has been issued using the license number. The license ID column 515 stores the license ID for uniquely identifying the license issued using the license number. The license number column 512 is the main key in the license number information table 511, and the records can be uniquely identified thereby. The records are additionally registered in the license number information table 511 for each purchased product. The added record respectively stores in the license number column 512 and the product ID column 513 a unique license number which has been newly issued and the product ID of the purchased product. Since the license number, the license ID, and the license-issued device number are associated with each other, the license management server 101 is capable of managing the device and the functions usable by a client.

FIG. 5C illustrates the device product information table 521. When a new model of the image forming apparatus is sold, the record thereof is additionally registered in the device product information table 521. Referring to FIG. 5C, a device product ID column 522 stores the device product ID for uniquely identifying the device product. A product name column 523 stores the product name corresponding to the device product ID. A PPM setting column 524 stores the information on whether it is necessary to set the continuous copying speed of the device product.

If the continuous copying speed of the device product is not set at the time of factory shipment, and the device product cannot use the basic functions of the image forming apparatus without setting the continuous copying speed by way of the license, "necessary" is input to the PPM setting column 524. Further, if the continuous copying speed of the device product is set at the time of factory shipment so that it is not necessary to issue the license for setting the continuous copying speed, "unnecessary" is input to the PPM setting column 524. Furthermore, if the continuous copying speed of the device product is set at the time of factory shipment, and the continuous copying speed is changeable by subsequently issuing the license for setting the continuous copying speed, "arbitrary" is input to the PPM setting column 524.

A model number column 525 stores first three digits of the device number, i.e., a model number of the image forming apparatus 103 belonging to the device product. A range column 526 stores the range which contains the last 5 digits of the device number of the image forming apparatus 103 belonging to the device product. The device product ID column 522 is the main key in the device product information table 521, and the records can be uniquely identified thereby.

Figure 6A:
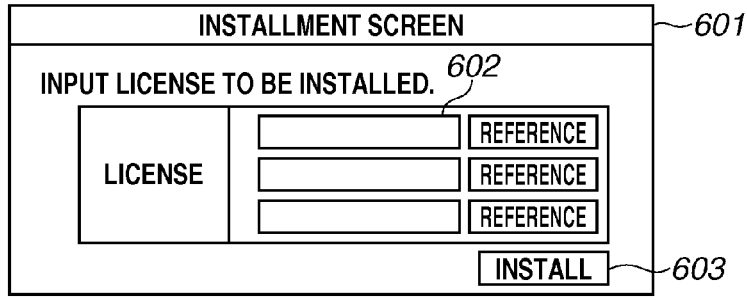
FIGS. 6A, 6B, 6C, 6D, and 6E illustrate examples of screens provided by the image forming apparatus.

FIGS. 6A, 6B, 6C, 6D, and 6E illustrates the screens provided by the image forming apparatus 103. FIG. 6A illustrates the installment screen 601 provided as a response from the installment screen display request receiving unit 357 to a requesting source. Referring to FIG. 6A, a license input field 602 is a field for inputting the license 901, and a plurality of licenses can be input thereto at once. An install button 603 is a button for transmitting to the image forming apparatus 103 the install request 801 including the licenses 901 input to the license input field 602.

Figure 6B:
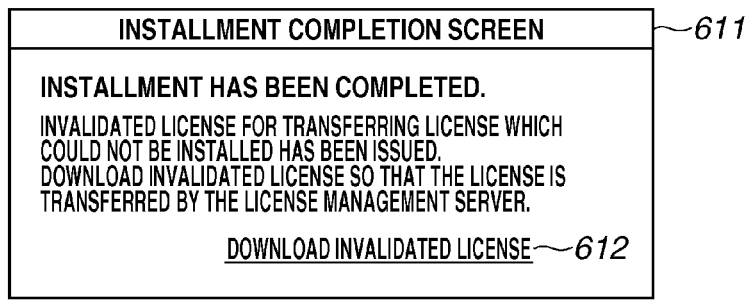
Figure 6C:
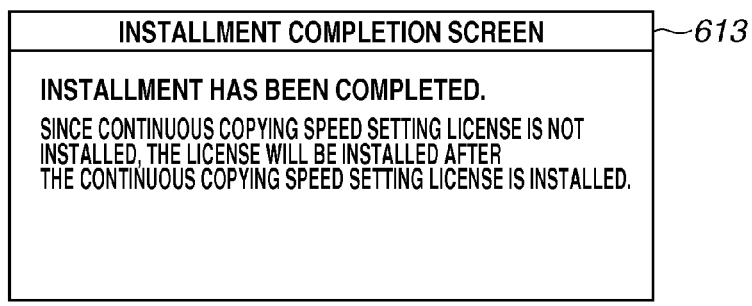

FIG. 6B illustrates an installment completion screen 611 displayed when the deferred license cannot be installed. Referring to FIG. 6B, an invalidated license download link 612 is used for downloading the invalidated license. FIG. 6C is an installment completion screen 613 displayed when the license for the extension function has been determined as a deferred license. More specifically, since the license for setting the continuous copying speed is not installed in the image forming apparatus, the license for the extension function is determined as a deferred license.

Figure 6D:
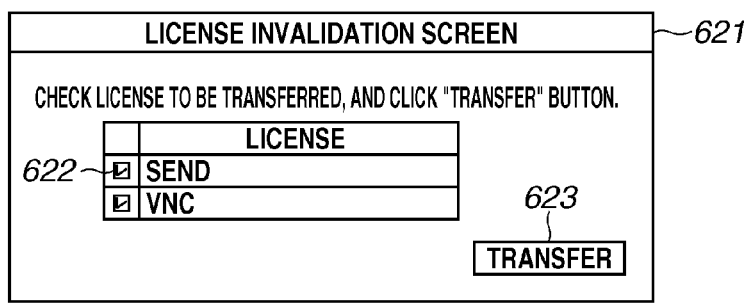
Figure 6E:
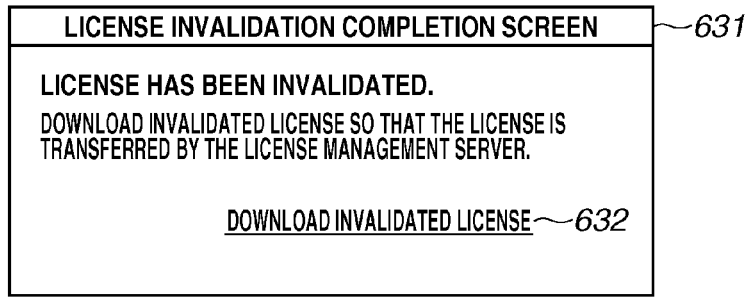

FIG. 6D illustrates the license invalidation screen 621 which is provided from the license invalidation screen display request receiving unit 358 as the response to the requesting source. Referring to FIG. 6D, an invalidation function check box 622 is used for selecting the function to be invalidated. A transfer button 623 is a button for transmitting to the image forming apparatus 103 the license transfer request 831 which includes the function ID selected using the invalidation function check box 622. FIG. 6E illustrates a license invalidation completion screen 631 for downloading the invalidated license. Referring to FIG. 6E, an invalidated license download link 632 is used for downloading the invalidated license.

FIGS. 7A, 7B, 7C, and 7D illustrate the screens provided by the license management server 101. FIG. 7A is a license issue screen 701 which is returned as a response from a license issue screen display request receiving unit 326 illustrated in FIG. 3A in the license management server 101. Referring to FIG. 7A, a license number input field 702 is a field for inputting the license number. A device number input field 703 is a field for inputting the device number. An issue button 704 is a button for transmitting to the license management server 101 the license issue request 811 including the license number input in the license number input field 702 and the device number input in the device number input field 703.

FIG. 7B illustrates a license issue completion screen 711. Referring to FIG. 7B, a license download link 712 is used for downloading the issued license. FIG. 7C illustrates a license transfer screen 721 which is returned as a response from a license transfer screen display requesting unit 327 illustrated in FIG. 3A in the license management server 101. Referring to FIG. 7C, an invalidated license input field 722 is a field for inputting the invalidated license. A transfer destination device number input field 723 is a field for inputting the device number of the image forming apparatus which is the transfer destination. An issue button 724 is a button for transferring to the license management server 101 the license transfer request 831 which includes the invalidated license input in the invalidated license input field 722 and the device number input in the transfer destination device number input field 723.

FIG. 7D illustrates an additional license issue screen 731 which is returned as a response from the license transfer request receiving unit 322. Referring to FIG. 7D, a license number input field 732 is a field for inputting the license number. An issue button 733 is a button for transmitting to the license management server 101 the additional license issue request 841 which includes the license number input in the license number input field 732.

FIGS. 8A, 8B, 8C, 8D, and 8E illustrate the data exchanged via the LAN 105 and the Internet 104. FIG. 8A illustrates the install request 801 which at least includes a license list 802, i.e., a list of the licenses to be installed. FIG. 8B illustrates the license issue request 811 which at least includes a device number 812 and a license number list 813. More specifically, the device number 812 is the device number of the image forming apparatus to which the license is issued, and the license number list 813 is the list of license numbers of the products corresponding to the licenses to be issued.

Figure 8C:
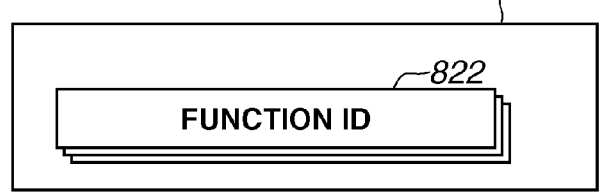
Figure 8D:
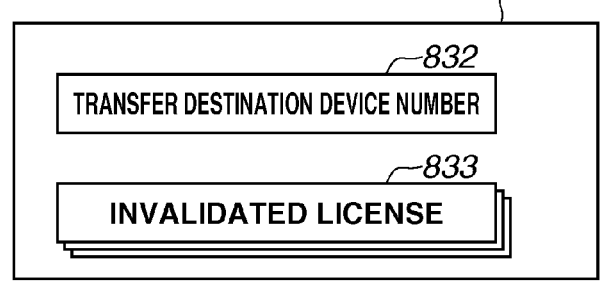

FIG. 8C illustrates the invalidated license issue request 821 which at least includes a function ID list 822, i.e., the list of the function ID corresponding to the functions to be invalidated. FIG. 8D illustrates the license transfer request 831 which at least includes a transfer destination device number 832 and an invalidated license list 833. More specifically, the transfer destination device number 832 is the device number of the image forming apparatus of the transfer destination to which the license is issued. The invalidated license list 833 is the list of the invalidated licenses for the extension functions to be transferred.

Figure 8E:
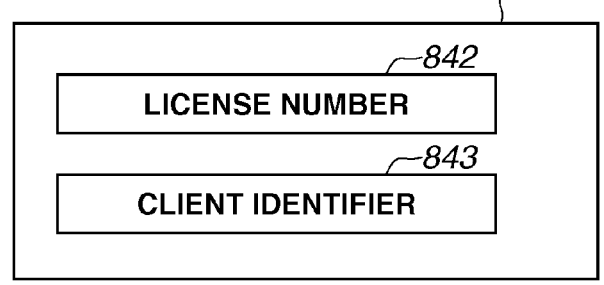

FIG. 8E illustrates an example of the additional license issue request 841 which at least includes a license number 842 and a client identifier 843. The license number 842 is the license number of the product to which the license is to be additionally issued. The client identifier 843 is used for identifying the information processing apparatus 102 which has issued the license transfer request 831.

Figure 9B:
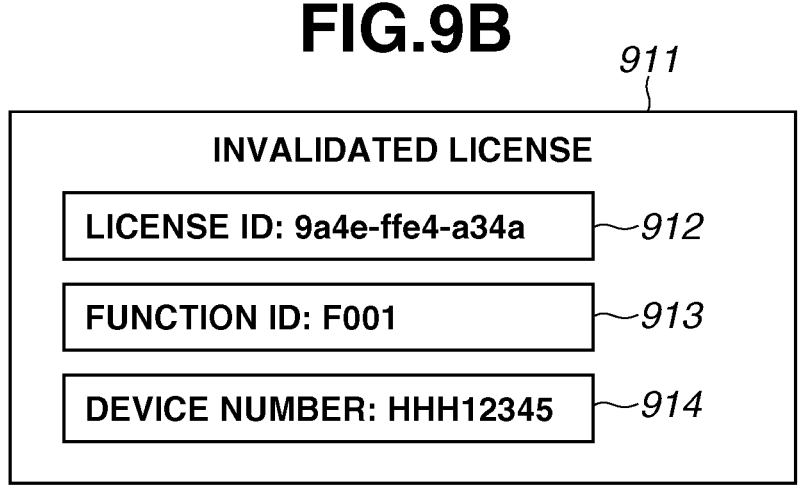

FIG. 9A illustrates the license 901 which at least includes the license ID 902, the function ID 903, and the device number 904. More specifically, the license ID 902 is an identifier which uniquely identifies the license. The function ID 903 is an ID for uniquely indicating the extension function of the image forming apparatus. The device number 904 is the device number of the image forming apparatus in which the license can be installed. FIG. 9B illustrates the invalidated license 911 which at least includes a license ID 912, the function ID 913, and a device number 914. More specifically, the license ID 912 is an identifier which uniquely identifies the invalidated license. The function ID 913 is an ID for uniquely indicating the extension function of the image forming apparatus which has been invalidated. The device number 914 is the device number of the image forming apparatus which has issued the invalidated license.

Figure 10:
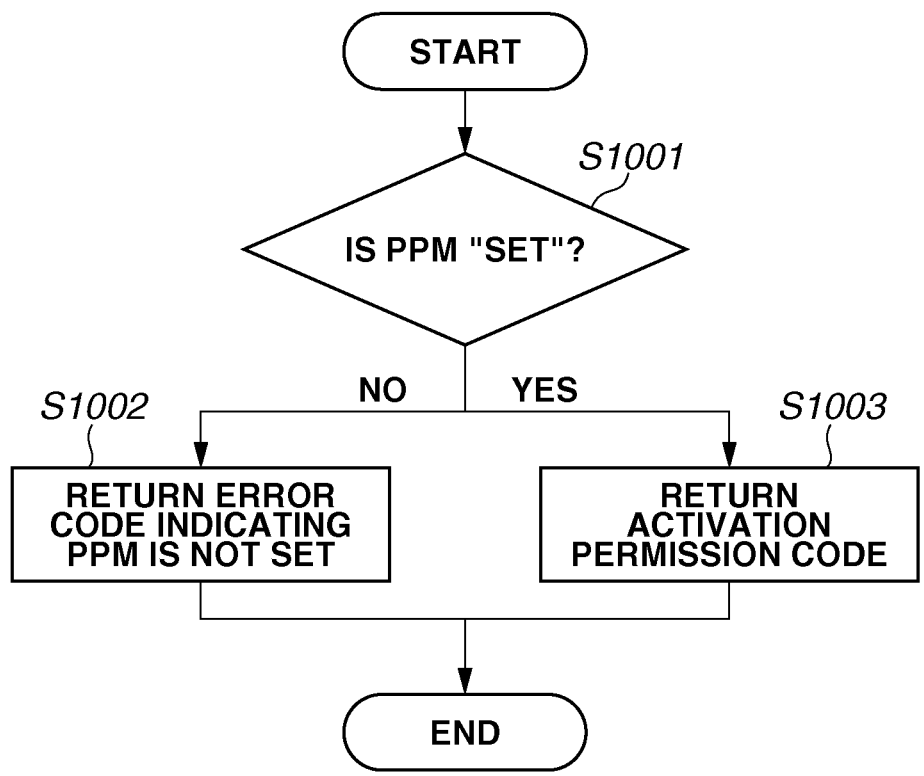
FIG. 10 is a flowchart illustrating an image forming apparatus activation process according to a first exemplary embodiment of the present invention.

The first exemplary embodiment of the present invention will be described below with reference to the flowcharts illustrated in FIG. 10 and thereafter. FIG. 10 is a flowchart illustrating a process performed by the PPM setting confirmation unit 356 in the image forming apparatus 103 which is called when the image forming apparatus 103 is switched on and the activation unit 351 has been activated. In step S1001, the PPM setting confirmation unit 356 obtains from the device product information storing unit 313 in the license management server 101 the value in the PPM column 413 of the device information table 411. If the obtained value is "set" (YES in step S1001), the process proceeds to step S1003. If the obtained value is other than "set" (NO in step S1001), the process proceeds to step S1002. In step S1002, the PPM setting confirmation unit 356 responds to the activation unit 351 by transmitting an error code which indicates that the PPM, i.e., the continuous copying speed, is not set. On the other hand, in step S1003, the PPM setting confirmation unit 356 responds to the activation unit 351 by transmitting an activation permission code which indicates that the PPM, i.e., the continuous copying speed, is set.

If the activation unit 351 receives the activation permission code as the response, the activation unit 351 continues performing the activation process. The activation unit 351 thus activates the image forming apparatus 103 in the state where the basic functions operate at the set continuous copying speed and the set extension functions are usable. Further, if the activation unit 351 receives the error code as the response, the activation unit 351 displays an error message indicating that the PPM, i.e., the continuous copying speed, is not set. The activation unit 351 then cancels the activation process, and activates the installment screen display request receiving unit 357 and the install request receiving unit 352.

Figure 11A:
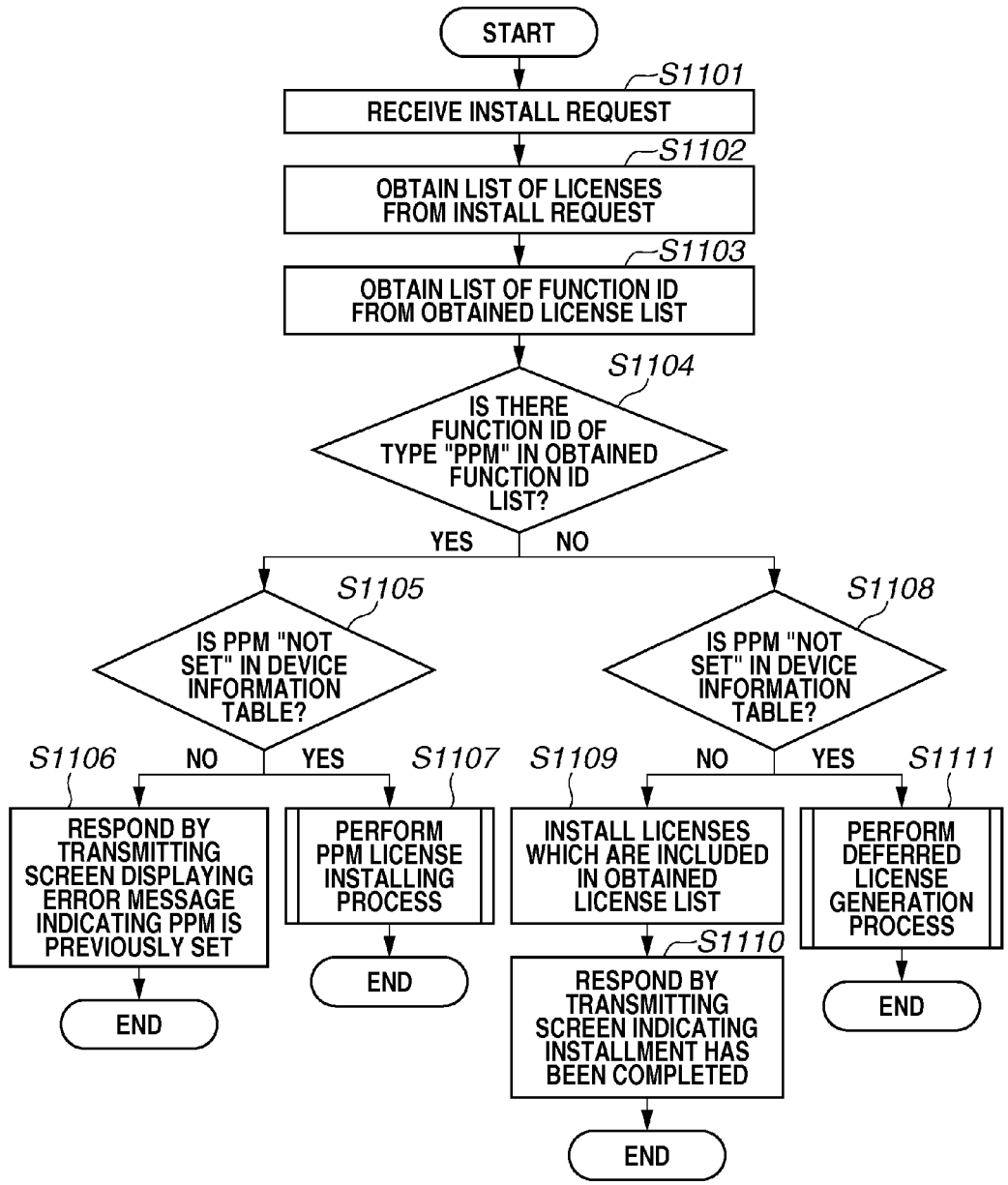

FIG. 11A is a flowchart illustrating the process performed by the install request receiving unit 352 when receiving the install request 801 from the network I/F 205. The user accesses the license management server 101 from a personal computer (PC) prior to the execution of the process illustrated in the flowchart of FIG. 11A. The user has thus obtained via the license issue request receiving unit 321 a list of the licenses 901 with respect to the image forming apparatus 103. Further, it is assumed that the obtained list of the licenses is designated in the license list 802 included in the install request 801. In step S1101, the install request receiving unit 352 receives the install request 801. In step S1102, the install request receiving unit 352 obtains the license list 802 from the install request 801 obtained in S1101. In step S1103, the install request receiving unit 352 obtains the function ID 903 from each of the licenses 901 in the license list 802 obtained in S1102, and thus obtains a function ID list.

In step S1104, the install request receiving unit 352 determines whether there is a function ID in the function ID list obtained in step S1103 of which the type is "PPM". More specifically, the install request receiving unit 352 obtains from the function ID information table 401 a list of the records which have the function ID corresponding to the function ID list obtained in step S1103. The install request receiving unit 352 then determines whether there is a record in which the value in the type column 404 is "PPM". If there is such a record (YES in step S1104), the process proceeds to step S1105. If there is no such record (NO in step S1104), the process proceeds to step S1108.

In step S1105, the install request receiving unit 352 obtains from the device information table 411 stored in the device product information storing unit 313 the value in the PPM column 413. If the obtained value in the PPM column 413 is not "not set" (NO in step S1105), the process proceeds to step S1106. If the obtained value in the PPM column 413 is "not set" (YES in step S1105), the process proceeds to step S1107. In step S1106, the install request receiving unit 352 responds to the install request 801 by transmitting a screen displaying an error message indicating that PPM, i.e., the continuous copying speed, is not previously set. The install request receiving unit 352 then cancels the installment process, and the process ends. On the other hand, in step S1107, the install request receiving unit 352 performs a PPM license installing process. The process then ends. The PPM license installing process will be described below with reference to FIG. 11B.

In step S1108, the install request receiving unit 352 obtains from the device information table 411 stored in the device product information storing unit 313 the value in the PPM column 413. If the obtained value in the PPM column 413 is not "not set" (NO in step S1108), the process proceeds to step S1109. If the obtained value in the PPM column 413 is "not set" (YES in step S1108), the process proceeds to step S1111. In step S1109, the install request receiving unit 352 uses the installing unit 354 and installs the licenses in the license list 802 obtained in step S1102. In step S1110, the install request receiving unit 352 responds to the install request 801 by returning the screen indicating that the installment has been completed. The process then ends. On the other hand, in step S1111, the install request receiving unit 352 performs a deferred license generation process, and the process ends. The deferred license generation process will be described below with reference to FIG. 11C.

FIG. 11B is a flowchart illustrating the PPM license installing process performed in step S1107 illustrated in FIG. 11A. In step S1121, the install request receiving unit 352 uses the installing unit 354 and installs the license of the function ID corresponding to the type "PPM" obtained in step S1104. By installing the license, the record containing the function ID stored in the license is added to the license information table 431. The activation unit 351 which has been activated when the image forming apparatus 103 is activated then causes the image forming apparatus 103 to operate at the continuous copying speed corresponding to the added function ID.

In step S1122, the install request receiving unit 352 sets the value "set" in the PPM column 413 of the device information table 411 stored in the device product information storing unit 313. By the install request receiving unit 352 setting the value "set" in the PPM column 413, the PPM setting confirmation unit 356 returns the activation permission code of the image forming apparatus 103 in conditional branching of step S1001. The basic functions of the image forming apparatus thus become usable. In such a case, the continuous copying speed specified based on the installed license is set to the image forming apparatus. For example, if the license sets the continuous copying speed of "50 PPM", the continuous copying speed of the image forming apparatus becomes 50 PPM.

In step S1123, the install request receiving unit 352 uses the installing unit 354 and installs the licenses in the license list 802 obtained in step S1102 other than the license installed in step S1121. Upon installing the licenses, the records containing the function ID stored in the licenses are added to the license information table 431. The activation unit 351 which has been activated when the image forming apparatus 103 is activated then allows the image forming apparatus 103 to use the extension functions corresponding to the added function ID.

In step S1124, the install request receiving unit 352 determines whether there are records in the deferred license table 441 stored in the deferred license storing unit 345. If there are no records (NO in step S1124), the process proceeds to step S1126. If there are records (YES in step S1124), the process proceeds to step S1125.

In step S1125, the install request receiving unit 352 obtains from the license column 442 stored in the deferred license table 441 a list of the deferred licenses. The install request receiving unit 352 then uses the installing unit 354 and installs the licenses in the deferred license list. As a result, the extension functions which are unusable since the continuous copying speed is not set to the image forming apparatus, become usable. In step S1126, the install request receiving unit 352 responds to the install request 801 by transmitting the screen display indicating that the installment has been completed.

FIG. 11C is a flowchart illustrating the deferred license generation process performed in step S1111 illustrated in FIG. 11A. In step S1141, the install request receiving unit 352 determines whether the device number 904 included in the license list 802 obtained in step S1102 matches the value in the device number column 412 of the device information table 411. If the values do not match (NO in step S1141), the process proceeds to step S1142. If the values match (YES in step S1141), the process proceeds to step S1143.

In step S1142, the install request receiving unit 352 responds to the install request 801 by returning a screen display indicating that the license cannot be installed. On the other hand, in step S1143, the install request receiving unit 352 stores in the hard disk 208 of the image forming apparatus 103 the license list 802 received in step S1102. The install request receiving unit 352 then adds to the deferred license table 441 the record in which the absolute path of the deferred license is contained as the value in the license column 442. In step S1144, the install request receiving unit 352 responds to the install request 801 by transmitting a screen display indicating that the installment has been deferred.

As described above, according to the first exemplary embodiment, the continuous copying speed can be set to the image forming apparatus after factory shipment by using the license. The risk of the increased inventories due to manufacturing the image forming apparatuses for each continuous copying speed can thus be reduced. Further, since the basic functions of the image forming apparatus cannot be used before the license has been installed, the user is caused to set the continuous copying speed after factory shipment. Furthermore, if the licenses for using the extension functions have been previously installed, the installment of the licenses are deferred, and the licenses are collectively installed after the continuous copying speed has been set to the image forming apparatus. As a result, the license which allows the extension function to be used is installed after the license for setting the continuous copying speed is installed, even when the user inputs the license list without considering which license is a license for setting the continuous copying speed.

The second exemplary embodiment of the present invention will be described below. According to the first exemplary embodiment, if the continuous copying speed has previously been set by other license for setting the continuous copying speed when the license is to be installed in the image forming apparatus 103, the error screen is displayed. However, if such an error occurs in the image forming apparatus 103, the license for setting the continuous copying speed which has caused the error becomes unusable, so that it becomes necessary to perform an operation for returning the license. According to the second exemplary embodiment, when the license management server 101 issues the license, it is determined whether it is necessary to issue to the image forming apparatus the license for setting the continuous copying speed. As a result, it is previously determined whether it is necessary to return the license.

FIG. 12A is a flowchart illustrating the process performed when the license issue request receiving unit 321 in the license management server 101 receives via the network I/F 226 the license issue request 811. In step S1201, the license issue request receiving unit 321 receives the license issue request 811. In step S1202, the license issue request receiving unit 321 obtains the device number 812 from the license issue request 811 received in step S1201.

In step S1203, the license issue request receiving unit 321 obtains the license number list 813 from the license issue request 811 received in step S1201.

In step S1204, the license issue request receiving unit 321 obtains, based on the device number 812 obtained in step S1202, the corresponding record as the device product information. The license issue request receiving unit 321 obtains the corresponding record from the device product information table 521 stored in the device product information storing unit 313. More specifically, the license issue request receiving unit 321 separates the first three digits and the last five digits of the device number 812 obtained in step S1202. The license issue request receiving unit 321 then obtains from the device product information table 521 the following record. The license issue request receiving unit 321 obtains the record in which the value in the type column 525 matches the first three digits of the device number 812 and the last five digits of the device number 812 fall within the range indicated by the value in the range column 526. For example, if the device number is "DDD11111", the device product ID is identified as "D0004".

In step S1205, the license issue request receiving unit 321 obtains the value in the PPM setting column 524 from the record of the device product information obtained in step S1204. In step S1206, the license issue request receiving unit 321 determines whether the value in the PPM setting column 524 obtained in step S1205 is "necessary". If the value is "necessary" (YES in step S1206), the process proceeds to step S1207. If the value is other than "necessary" (NO in step S1206), the process proceeds to step S1208. In step S1207, the license issue request receiving unit 321 performs the license issuing process with respect to the case where the PPM setting is necessary, and the process ends. The license issuing process with respect to the case where the PPM setting is necessary will be described below with reference to the flowchart illustrated in FIG. 12B.

In step S1208, the license issue request receiving unit 321 determines whether the value in the PPM setting column 524 obtained in step S1205 is "arbitrary". If the value is "arbitrary" (YES in step S1208), the process proceeds to step S1211. If the value is not "arbitrary" (NO in step S1208), the process proceeds to step S1209. In step S1209, the license issue request receiving unit 321 uses the license issuing unit 323 and issues the license based on the device number 812 obtained in step S1202 and the license number list 813 obtained in step S1203.

In step S1210, the license issue request receiving unit 321 responds to the license issue request 811 by transmitting the license issue completion screen 711 for obtaining the license issued in step S1209. On the other hand, in step S1211, the license issue request receiving unit 321 performs the license issuing process with respect to the case where the PPM setting is arbitrary, and the process ends. If the PPM setting in the image forming apparatus is "arbitrary", it indicates that the continuous copying speed has been set at the time of factory shipment, and can be subsequently changed by issuing of the license for setting the continuous copying speed. As a result, control can be performed such that the license for the extension functions is issued even when the license for setting the continuous copying speed has not been issued in the license issuing process in the case where the PPM setting is arbitrary. The process will not be described in detail according to the second exemplary embodiment.

Figure 12B:
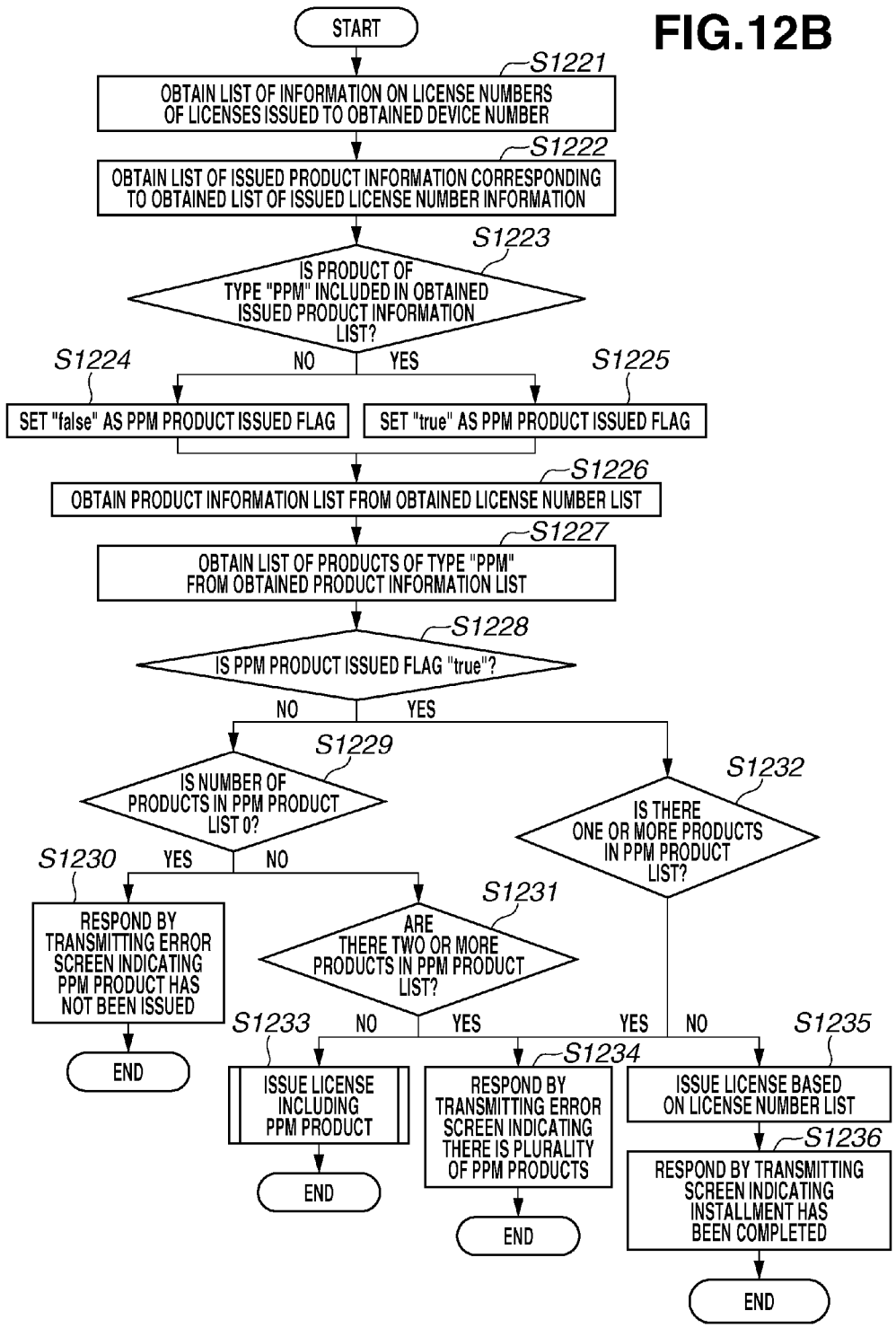

FIG. 12B is a flowchart illustrating the license issuing process in the case where the PPM setting is necessary performed in step S1207 of the flowchart illustrated in FIG. 12A. In step S1221, the license issue request receiving unit 321 obtains as an issued license number information list the list of the following records. The license issue request receiving unit 321 obtains the list of records in which the device number 812 obtained in step S1202 matches the value in the license-issued device number column 514 of the license number information table 511.

In step S1222, the license issue request receiving unit 321 obtains the list of the following records as an issued product information list. The license issue request receiving unit 321 obtains the records in the issued license number information list obtained in step S1221, in which the value in the product ID column 513 matches the value in the product ID column 502 of the product information table 501. In step S1223, the license issue request receiving unit 321 determines whether there is a record in the issued product information list obtained in step S1222 in which the value in the type column 504 is "PPM". If there is such a record (YES in step S1223), the process proceeds to step S1225. If there is no such record (NO in step S1223), the process proceeds to step S1224.

In step S1224, the license issue request receiving unit 321 sets "false" as a value of a PPM product issued flag, and stores the data in the volatile memory 225 of the license management server 101. In step S1225, the license issue request receiving unit 321 sets "true" as the value of the PPM product issued flag, and stores the data in the volatile memory 225 of the license management server 101. In step S1226, the license issue request receiving unit 321 obtains a product information list based on the license number list 813 obtained in step S1203. More specifically, the license issue request receiving unit 321 obtains the list of records from the license number information table 511 in which the value in the license number column 512 matches each of the license numbers obtained in step S1203.

In step S1227, the license issue request receiving unit 321 obtains a PPM product information list from the product information list obtained in step S1226. More specifically, the license issue request receiving unit 321 obtains the list of product information corresponding to the records in the product information table 501 of which the value in the type column 504 is "PPM". In step S1228, the license issue request receiving unit 321 determines whether the PPM product issued flag stored in the volatile memory 225 of the license management server 101 is set to "true". If the value of the flag is "true" (YES in step S1228), the process proceeds to step S1232. If the flag is not set to "true" (NO in step S1228), the process proceeds to step S1229.

In step S1229, the license issue request receiving unit 321 determines whether the number of the products in the PPM product information list obtained in step S1227 is 0. If the number of products is 0 (YES in step S1229), the process proceeds to step S1230. If the number of products is not 0 (NO in step S1229), the process proceeds to step S1231. In step S1230, the license issue request receiving unit 321 responds to the license issue request 811 by transmitting the error screen which indicates that the PPM product has not been issued. In step S1231, the license issue request receiving unit 321 determines whether the number of products in the PPM product list obtained in step S1227 is 2 or more. If the number of products is 2 or more (YES in step S1231), the process proceeds to step S1234. If the number of products is not 2 or more (NO in step S1231), the process proceeds to step S1233.

In step S1232, the license issue request receiving unit 321 determines whether the number of products in the PPM product list obtained in step S1227 is 1 or more. If the number of products is 1 or more (YES in step S1232), the process proceeds to step S1234. If the number of products is not 1 or more (NO in step S1232), the process proceeds to step S1235. In step S1233, the license issue request receiving unit 321 issues the license including the PPM product. The process for issuing the license including the PPM product will be described below with reference to the flowchart illustrated in FIG. 12C.

In step S1234, the license issue request receiving unit 321 responds to the license issue request 811 by transmitting the error screen which indicates that there is a plurality of PPM products. In step S1235, the license issue request receiving unit 321 uses the license issuing unit 323 and issues the license based on the device number 812 obtained in step S1202 and the license number list 813 obtained in step S1203. In step S1236, the license issue request receiving unit 321 responds to the license issue request 811 by transmitting the license issue completion screen 711 for obtaining the license issued in step S1235. The process then ends.

FIG. 12C is a flowchart illustrating the process for issuing the license including the PPM product performed in step S1233. In step S1251, the license issue request receiving unit 321 identifies the license number among the license number list 813 obtained in step S1203 which is included in the PPM product list obtained in step S1227. The license issue request receiving unit 321 then uses the license issuing unit 323 and issues the license based on the identified license number and the device number 812 obtained in step S1202.

In step S1252, the license issue request receiving unit 321 uses the license issuing unit 323 and issues the licenses of the license numbers in the license number list 813 obtained in step S1203 other than that of the license issued in step S1251. In step S1253, the license issue request receiving unit 321 responds to the license issue request 811 by transmitting the license issue completion screen 711 for obtaining the licenses issued in step S1251 and step S1252. The process then ends.

As described above, according to the second exemplary embodiment, when the license is to be issued, it is determined whether the license for setting the continuous copying speed has been previously issued. As a result, unnecessary issuing of the licenses is prevented.

A third exemplary embodiment of the present invention will be described below. According to the first and second exemplary embodiments, the licenses are not transferred to other image forming apparatuses. According to the third exemplary embodiment, the case where the licenses are transferred to other image forming apparatuses will be described below.

Figure 13:
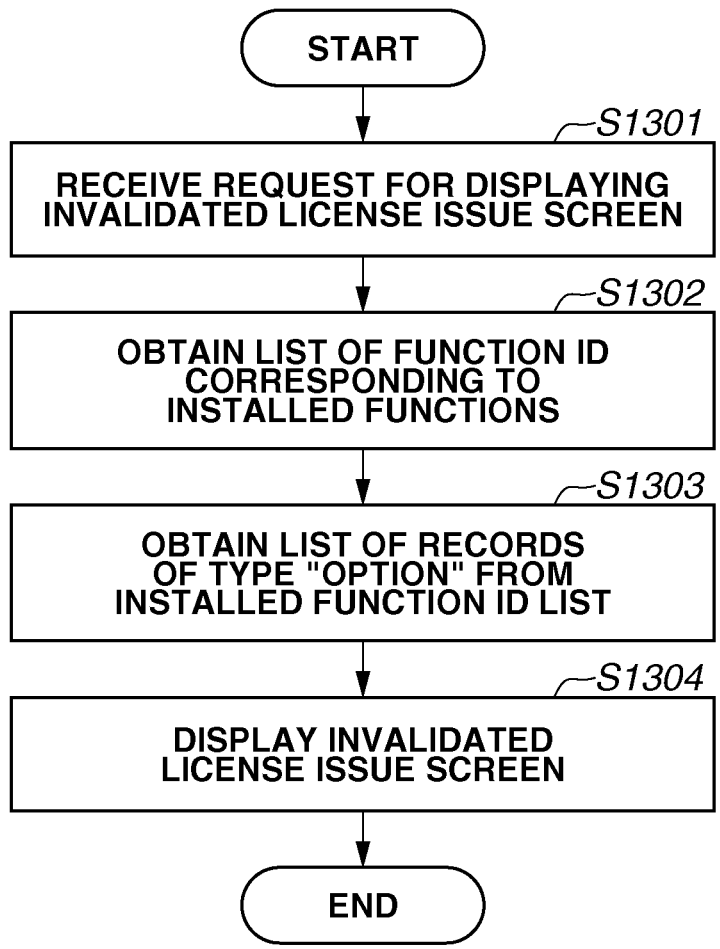
FIG. 13 is a flowchart illustrating a process for displaying a license invalidation screen according to a third exemplary embodiment of the present invention.

FIG. 13 is a flowchart illustrating the process performed by the invalidated license issue screen display request receiving unit 328 (not illustrated) which receives the invalidated license issue screen display request via the network I/F 205.

In step S1301, the invalidated license issue screen display request receiving unit 328 receives the invalidated license issue screen display request. In step S1302, the invalidated license issue screen display request receiving unit 328 obtains the list of installed function ID. More specifically, the invalidated license issue screen display request receiving unit 328 obtains the values in the function ID column 432 of all records in the license information table 431. In step S1303, the invalidated license issue screen display request receiving unit 328 obtains the list of records in the function ID information table 401 in which the value in the function ID column 402 matches the installed function ID obtained in step S1302. The invalidated license issue screen display request receiving unit 328 then obtains the list of records in the above-described list in which the value in the type column 404 is "OPTION".

In step S1304, the invalidated license issue screen display request receiving unit 328 responds to the invalidated license issue screen display request by transmitting an invalidated license issue screen which only displays the records in which the value in the type column 404 is "OPTION" obtained in step S1303. The process then ends.

FIG. 14 is a flowchart illustrating the process performed when the invalidated license issue request receiving unit 353 in the image forming apparatus 103 receives via the network I/F 205 the invalidated license issue request 821. In step S1401, the invalidated license issue request receiving unit 353 receives the invalidated license issue request 821. In step S1402, the invalidated license issue request receiving unit 353 obtains the function ID list 822, i.e., a list of transfer function ID, from the invalidated license issue request 821 obtained in step S1401. In step S1403, the invalidated license issue request receiving unit 353 uses the license invalidation unit 355 and issues the invalidated license with respect to each of the function ID in the list of transfer function ID obtained in step S1402. In step S1404, the invalidated license issue request receiving unit 353 displays the license invalidation completion screen 631 for downloading the list of invalidated licenses issued in step S1403. The process then ends.

Figure 15A:
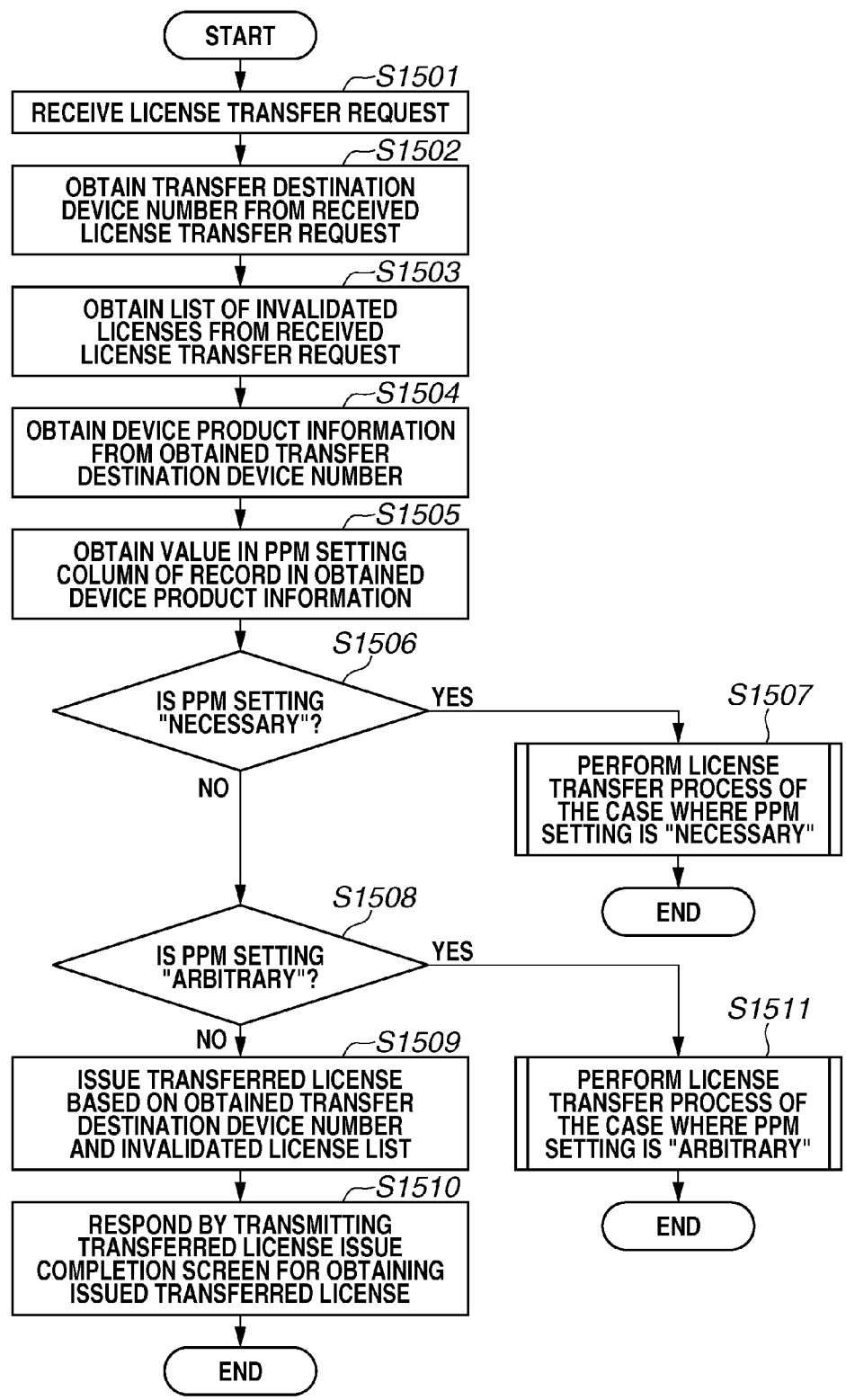
FIGS. 15A and 15B are flowcharts illustrating a license transfer process according to the third exemplary embodiment.

FIG. 15A is a flowchart illustrating the process performed when the license transfer request receiving unit 322 in the license management server 101 receives via the network I/F 226 the license transfer request 831. In step S1501, the license transfer request receiving unit 322 receives the license transfer request 831. In step S1502, the license transfer request receiving unit 322 obtains the transfer destination device number 832 from the license transfer request 831 received in step S1501. In step S1503, the license transfer request receiving unit 322 obtains the invalidated license list 833 from the license transfer request 831 received in step S1501.

In step S1504, the license transfer request receiving unit 322 obtains from the transfer destination device number 832 obtained in step S1502 the device product information. More specifically, the license transfer request receiving unit 322 separates the first three digits and the last 5 digits of the transfer destination device number 832 obtained in step S1502. The license transfer request receiving unit 322 then obtains the records in the device product information table 521 in which the value in the model column 525 matches the first three digits of the transfer destination device number 832 and the last five digits of the transfer destination device number 832 fall within the range indicated by the value in the range column 526.

In step S1505, the license transfer request receiving unit 322 obtains the value in the PPM setting column 524 from the device product information records obtained in step S1504. In step S1506, the license transfer request receiving unit 322 determines whether the value obtained in step S1505 is "necessary". If the value is "necessary" (YES in step S1506), the process proceeds to step S1507. If the value is other than "necessary" (NO in step S1506), the process proceeds to step S1508.

In step S1507, the license transfer request receiving unit 322 performs the process for transferring the license in the case where the PPM setting is "necessary". The process for transferring the license in the case where the PPM setting is "necessary" will be described below with reference to the flowchart illustrated in FIG. 15B. In step S1508, the license transfer request receiving unit 322 determines whether the value obtained in step S1505 is "arbitrary". If the value is "arbitrary" (YES in step S1508), the process proceeds to step S1511. If the value is other than "arbitrary" (NO in step S1508), the process proceeds to step S1509.

In step S1509, the license transfer request receiving unit 322 uses the license transfer unit 324 and issues a transfer license based on the transfer destination device number 832 obtained in step S1502 and the invalidated license list obtained in step S1503. In step S1510, the license transfer request receiving unit 322 responds to the license transfer request 831 by transmitting the license issue completion screen 711 for obtaining the transfer license issued in step S1509. On the other hand, in step S1511, the license transfer request receiving unit 322 performs the process for transferring the license in the case where the PPM setting is "arbitrary". The description on the process for transferring the license in the case where the PPM setting is "arbitrary" will be omitted.

Figure 15B:
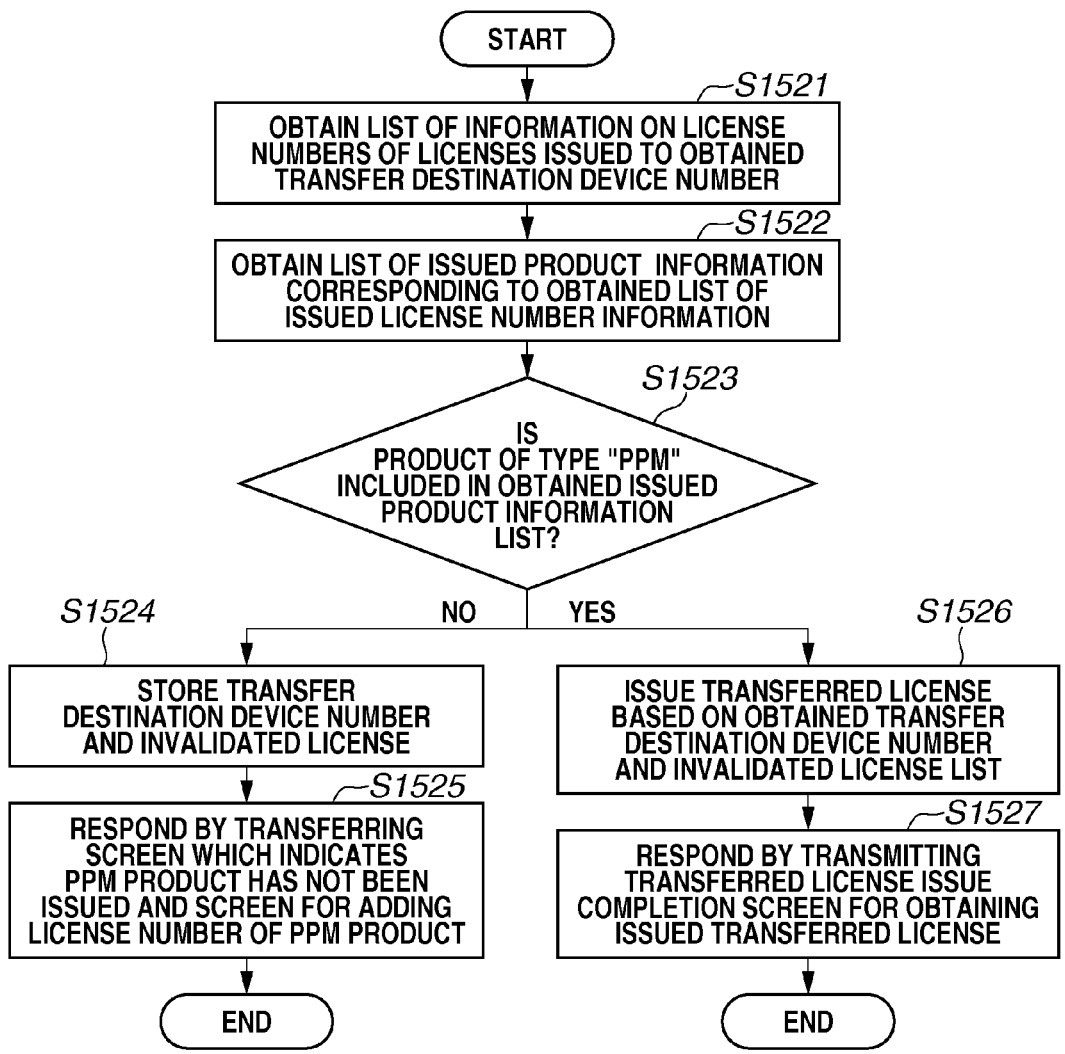

FIG. 15B is a flowchart illustrating the process for transferring the license in the case where the PPM setting performed in step S1507 of the flowchart illustrated in FIG. 15A is "necessary". In step S1521, the license transfer request receiving unit 322 obtains as the issued license number information list the list of the license numbers issued to the device having the transfer destination device number 832 obtained in step S1502. More specifically, the license transfer request receiving unit 322 obtains the list of records in the license number information table 511 stored in the license number information storing unit 312 in which the value in the license-issued device number column 514 matches the transfer destination device number 832 obtained in step S1502.

In step S1522, the license transfer request receiving unit 322 obtains an issued product information list corresponding to the issued license number information list obtained in step S1521. More specifically, the license transfer request receiving unit 322 obtains the list of records in the product information table 501 stored in the product information storing unit 311 in which the value in the product ID column 502 matches the value in the product ID column 513 of the records in the issued license number information list obtained in step S1521.

In step S1523, the license transfer request receiving unit 322 determines whether there is a record in the issued product information list obtained in step S1522 in which the value in the type column 504 is "PPM". If there is such a record (YES in step S1523), the process proceeds to step S1526. If there is no such record (NO in step S1523), the process proceeds to step S1524.

In step S1524, the license transfer request receiving unit 322 stores in the hard disk 224 of the license management server 101 the transfer destination device number 832 obtained in step S1502 and the invalidated license list 833 obtained in step S1503. At that time, the license transfer request receiving unit 322 stores the transfer destination device number 832 by associating a location in which the data is stored, with the client identifier for identifying the information processing apparatus 102 which has issued the license transfer request 831. The storage location thus becomes identifiable. For example, the client identifier may be a session ID, and the data is stored using the session ID in the path to be stored in the hard disk 224.

In step S1525, the license transfer request receiving unit 322 responds to the license transfer request 831 by transmitting the additional license issue screen 731 for inputting the additional license numbers. The additional license issue screen 731 includes the client identifier used in step S1524 as information. On the other hand, in step S1526, the license transfer request receiving unit 322 uses the license transfer unit 324 and issues the transfer license based on the transfer destination device number 832 obtained in step S1502 and the invalidated license list 833 obtained in step S1503. In step S1527, the license transfer request receiving unit 322 responds to the license transfer request 831 by transmitting the license issue completion screen 711 for obtaining the transfer license issued in step S1526.

Figure 16:
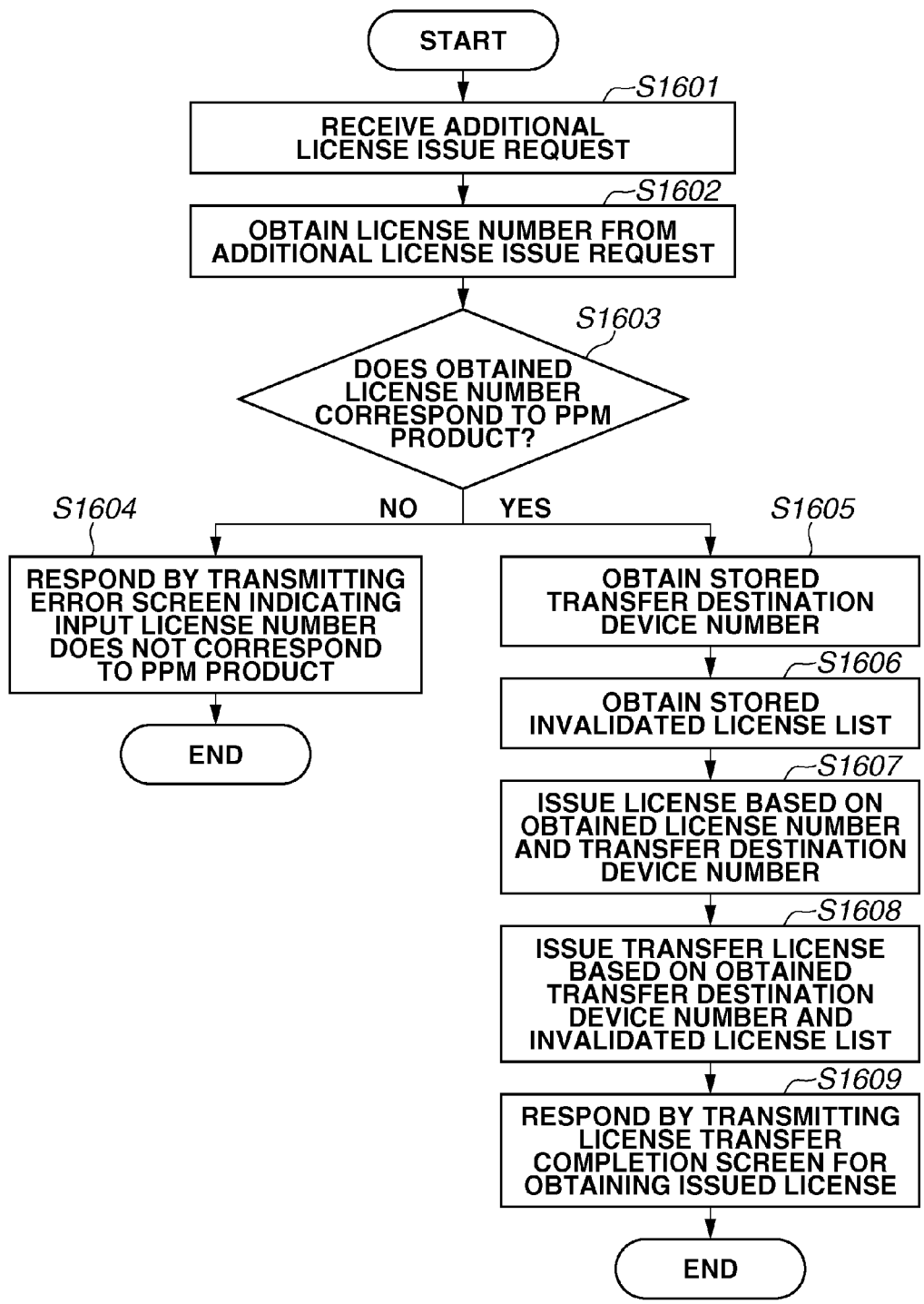
FIG. 16 is a flowchart illustrating a process for issuing an additional license when transferring the license according to the third exemplary embodiment.

FIG. 16 is a flowchart illustrating the process performed when the additional license issue request receiving unit 325 in the license management server 101 receives via the network I/F 226 the additional license issue request 841. In step S1601, the additional license issue request receiving unit 325 receives the additional license issue request 841. In step S1602, the additional license issue request receiving unit 325 obtains the license number 842 from the additional license issue request 841 received in step S1601. In step S1603, the additional license issue request receiving unit 325 obtains from the license number information table 511 the product information record which includes as the value in the license number column 512 the license number obtained in step S1602. The additional license issue request receiving unit 325 then determines whether the value in the type column 504 of the obtained product information record is "PPM". If the value is "PPM" (YES in step S1603), the process proceeds to step S1605. If the value is other than "PPM" (NO in step S1603), the process proceeds to step S1604.

In step S1604, the additional license issue request receiving unit 325 displays the error screen indicating that the input license number is not a PPM product. The process then ends. On the other hand, in step S1605, the additional license issue request receiving unit 325 obtains the client identifier 843 from the additional license issue request 841 received in step S1601. The additional license issue request receiving unit 325 then obtains, based on the obtained client identifier 843, the transfer destination device number 832 stored in step S1524.

In step S1606, the additional license issue request receiving unit 325 obtains the client identifier 843 from the additional license issue request 841 received in step S1601. The additional license issue request receiving unit 325 then obtains, based on the obtained client identifier 843, the invalidated license list 833 stored in step S1524.

In step S1607, the additional license issue request receiving unit 325 uses the license issuing unit 323 and issues the license based on the license number 842 obtained in step S1602 and the transfer destination device number 832 obtained in step S1605. In step S1608, the additional license issue request receiving unit 325 uses the license transfer unit 324 and issues the transfer license based on the transfer destination device number 832 obtained in step S1605 and the invalidated license list 833 obtained in step S1606. In step S1609, the additional license issue request receiving unit 325 responds to the license transfer request 831 by transmitting the license issue completion screen 711 for obtaining the license issued in step S1607 and the transfer license issued in step S1608.

As described above, according to the third exemplary embodiment, when the license is to be transferred, the list for invalidating only the licenses for using the extension functions is displayed. The license for setting the continuous copying speed is thus prevented from being transferred. Further, if the license for setting the continuous copying speed is not issued to the image forming apparatus to which the license is transferred, the screen which allows the license number of the continuous copying speed setting license to be additionally issued is provided. A user interface with higher usability can thus be provided to the user.

The fourth exemplary embodiment according to the present invention will be described below. According to the above-described first, second, and third exemplary embodiments, the license is installed in the case where the license for setting the continuous copying speed is subsequently set to the image forming apparatus to which the continuous copying speed has not been set. However, there are demands to set the continuous copying speed so that the model number in the device number is associated with the continuous copying speed. For example, if the model number corresponding to "40 PPM" is set as "AAA", sales of the function-extended product of 40 PPM can be confirmed by using the information corresponding to "AAA". Further, if the device number is changed according to the continuous copying speed, the continuous copying speed of the image forming apparatus becomes recognizable based on the device number. Consumption levels of consumables thus become predictable. As the fourth exemplary embodiment, a method for changing the device number according to the continuous copying speed will be described below.

Figure 17A:
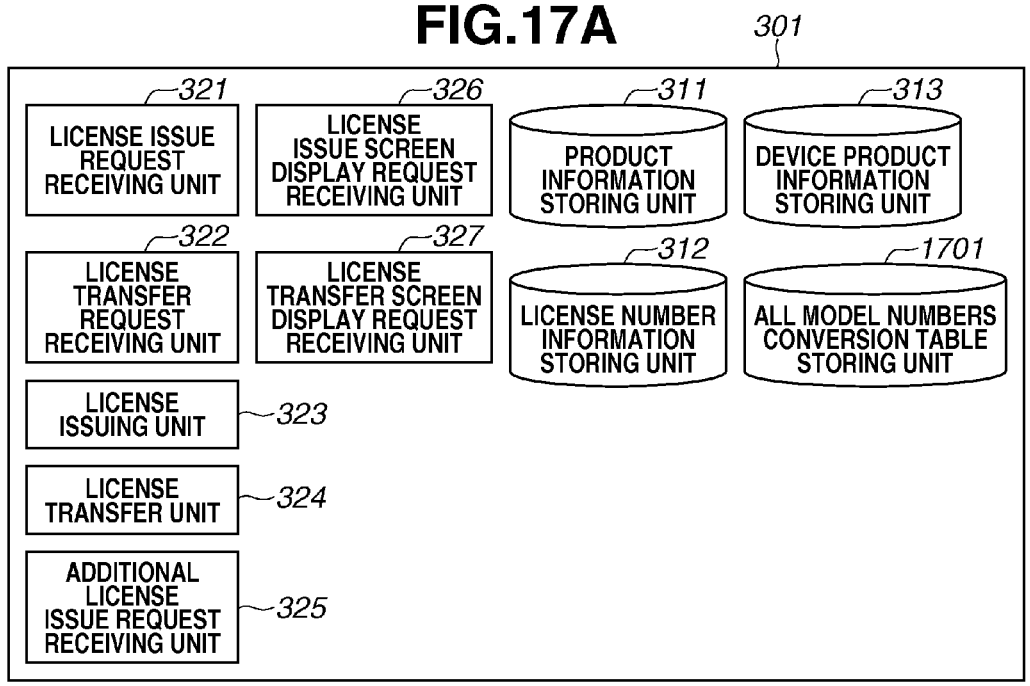
FIGS. 17A and 17B illustrate software configurations according to a fourth exemplary embodiment of the present invention.
Figure 17B:
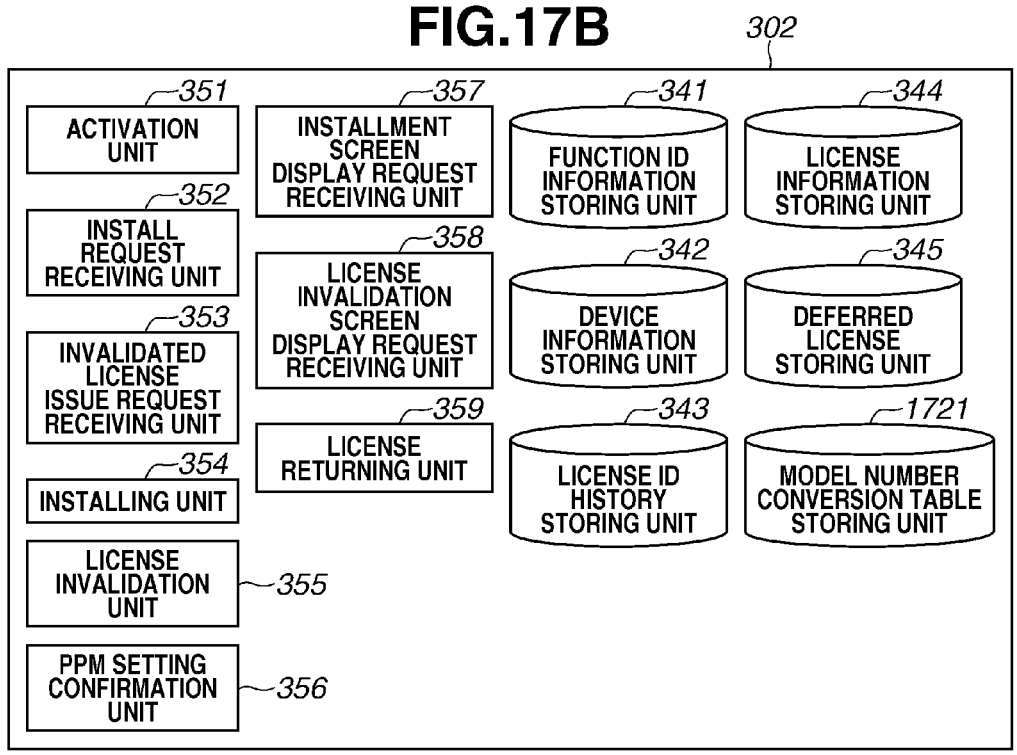

FIGS. 17A and 17B illustrate the software configurations for realizing the fourth exemplary embodiment. Referring to FIGS. 17A and 17B, two units are added to the software configurations illustrated in FIGS. 3A and 3B. More specifically, an all model numbers conversion table storing unit 1701 stores in the hard disk 224 of the license management server 101 an all model number conversion table 1901 to be described below. Further, a model number conversion table storing unit 1721 stores in the hard disk 208 of the image forming apparatus 103 a model number conversion table 1801 to be described below.

Figure 18:
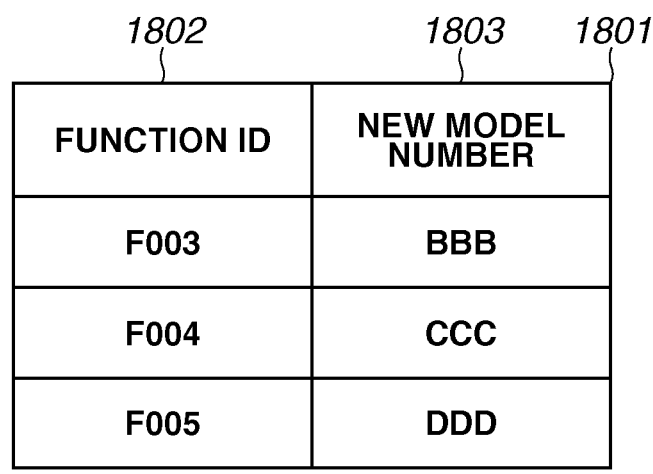
FIG. 18 illustrates an example of a table stored in the image forming apparatus according to the fourth exemplary embodiment.

FIG. 18 illustrates the model number conversion table 1801 stored in the hard disk 208 of the image forming apparatus 103. The records in the model number conversion table 1801 are previously set as the master data at the time of factory shipment. Referring to FIG. 18, a function ID column 1802 stores the function ID. A new model number column 1803 stores the new model number. The function ID column 1802 becomes the main key in the model number conversion table 1801, and the record can be uniquely identified thereby.

FIG. 19 illustrates the all model number conversion table 1901 stored in the hard disk 224 of the license management server 101. Referring to FIG. 19, a function ID column 1902 stores the function ID. An original model number column 1903 stores the model number before being changed. A new model number column 1904 stores the new model number. The function ID column 1902 and the original model number column 1903 become integrated keys in the all model number conversion table 1901, and the records can be uniquely identified thereby.

Figure 20:
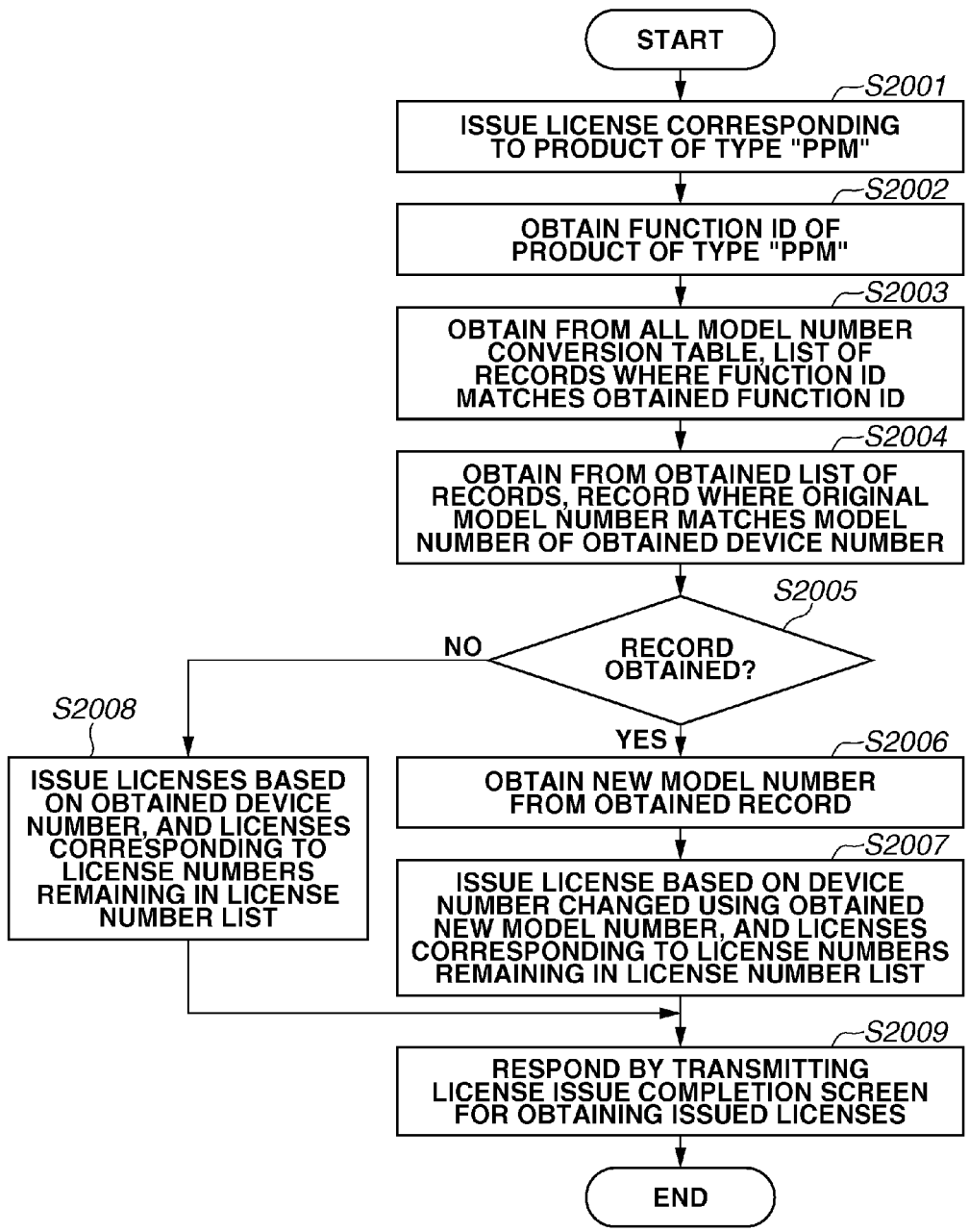
FIG. 20 is a flowchart illustrating a license issuing process according to the fourth exemplary embodiment.

The changes in the fourth exemplary embodiment from the processes illustrated in the flowcharts according to the first, second, and third exemplary embodiments will be described below with reference to the flowcharts illustrated in FIGS. 20, 21A, 21B, and 22. FIG. 20 is a flowchart illustrating the process for issuing the license including the PPM product, performed in step S1233 illustrated in FIG. 12B. The flowchart in FIG. 20 is performed instead of the process of the flowchart illustrated in FIG. 12C. In step S2001, the license issue request receiving unit 321 identifies the license numbers which are included in the PPM product list obtained in step S1227 from among the license number list 813 obtained in step S1203. The license issue request receiving unit 321 then uses the license issuing unit 323 and issues the license based on the identified license number and the device number 812 obtained in step S1202.

In step S2002, the license issue request receiving unit 321 obtains the values in the function ID column of the product information record obtained in step S1227. In step S2003, the license issue request receiving unit 321 obtains the list of records in the all model number conversion table 1901 in which the value in the function ID column 1902 matches the function ID obtained in step S2002. In step S2004, the license issue request receiving unit 321 obtains from the record list obtained in step S2003, the record in which the value in the original model number column 1903 matches the first three digits of the device number 812 obtained in step S1202. In step S2005, the license issue request receiving unit 321 determines whether a record has been obtained in step S2004. If the record has been obtained (YES in step S2005), the process proceeds to step S2006. If the record has not been obtained (NO in step S2005), the process proceeds to step S2008.

In step S2006, the license issue request receiving unit 321 obtains as the new model number the value in the new model number column 1904 of the record obtained in step S2004. In step S2007, the license issue request receiving unit 321 uses the license issuing unit 323 and issues the license among the list of license numbers obtained in step S1203 which corresponds to the license number other than that of the license issued in step S2001. The license issue request receiving unit 321 uses as the device number to be employed in issuing the license, the value in which the first three digits of the device number obtained in step S1202 is replaced by the new model number obtained in step S2006.

On the other hand, in step S2008, the license issue request receiving unit 321 uses the license issuing unit 323 and issues the license which corresponds to the license number in the license number list 813 obtained in step S1203 other than that of the license issued in step S2001. The license issue request receiving unit 321 uses the device number 812 obtained in step S1202 as the device number to be employed when issuing the license. In step S2009, the license issue request receiving unit 321 responds to the license issue request 811 by transmitting the license issue completion screen 711 for obtaining the license issued in step S2007 or step S2008.

FIG. 21A is a flowchart illustrating the PPM license installing process performed in step S1107 of the flowchart illustrated in FIG. 11A, which is performed instead of the process of the flowchart illustrated in FIG. 11B. In step S2101, the install request receiving unit 352 uses the installing unit 354 and installs the license for the function ID corresponding to the type "PPM" obtained in step S1104. In step S2102, the install request receiving unit 352 sets the value "set" in the PPM column 413 of the device information table 411 stored in the device product information storing unit 313.

In step S2103, the install request receiving unit 352 determines whether the function ID corresponding to the license installed in step S2101 exists as a value in the function ID column 1802 of the model number conversion table 1801. If the function ID exists (YES in step S2103), the process proceeds to step S2104. If the function ID does not exist (NO in step S2103), the process proceeds to step S2106. In step S2104, the install request receiving unit 352 obtains as the new model number the value in the new model number column 1802 of the record determined to be existing in step S2103.

In step S2105, the install request receiving unit 352 sets the value in the device number column 412 as follows. The install request receiving unit 352 replaces the first three digits of the value in the device number column 412 of the device information table 411 by the new model number obtained in step S2104. For example, if the value in the device number column 412 is "AAA12345" and the new model number obtained in step S2104 is "BBB", "BBB12345" is set as the value in the device number column 412. The device number according to the continuous copying speed set in step S2101 can thus be changed along with the change in the value in the device number column 412.

In step S2106, the install request receiving unit 352 uses the installing unit 354 and installs the license in the license list 802 obtained in step S1102 other than the license installed in step S2101. In step S2107, the install request receiving unit 352 determines whether there are records in the deferred license table 441 stored in the deferred license storing unit 345. If there are no records (NO in step S2107), the process proceeds to step S2114. If there are records (YES in step S2107), the process proceeds to step S2108.

In step S2108, the install request receiving unit 352 obtains from the license column 442 in the deferred license table 441 a list of the deferred licenses. In step S2109, the install request receiving unit 352 determines whether there is a license among the deferred licenses obtained in step S2108 in which the value in the device number 904 matches the value in the device number column 412 of the device information table 411. If there is such a license (YES in step S2109), the process proceeds to step S2110. If there is no such license (NO in step S2109), the process proceeds to step S2111.

In step S2110, the install request receiving unit 352 uses the installing unit 354 and installs the deferred licenses in which the device numbers have matched in step S2109. In step S2111, the install request receiving unit 352 determines whether there is a license among the deferred licenses obtained in step S2108 in which the value in the device number 904 does not match the value in the device number column 412 of the device information table 411. If there is such a license (YES in step S2111), the process proceeds to step S2112. If there is no such license (NO in step S2111), the process proceeds to step S2114. In step S2112, the install request receiving unit 352 issues the invalidated license for transferring the deferred license in which the matching device number does not exist according to the determination in step S2111.

In step S2113, the install request receiving unit 352 responds to the install request 801 by transmitting the screen display indicating that the installment has been completed and used for downloading the invalidated license issued in step S2112. In step S2114, the install request receiving unit 352 responds to the install request 801 by transmitting the screen display indicating that the installment has been completed.

Figure 21B:
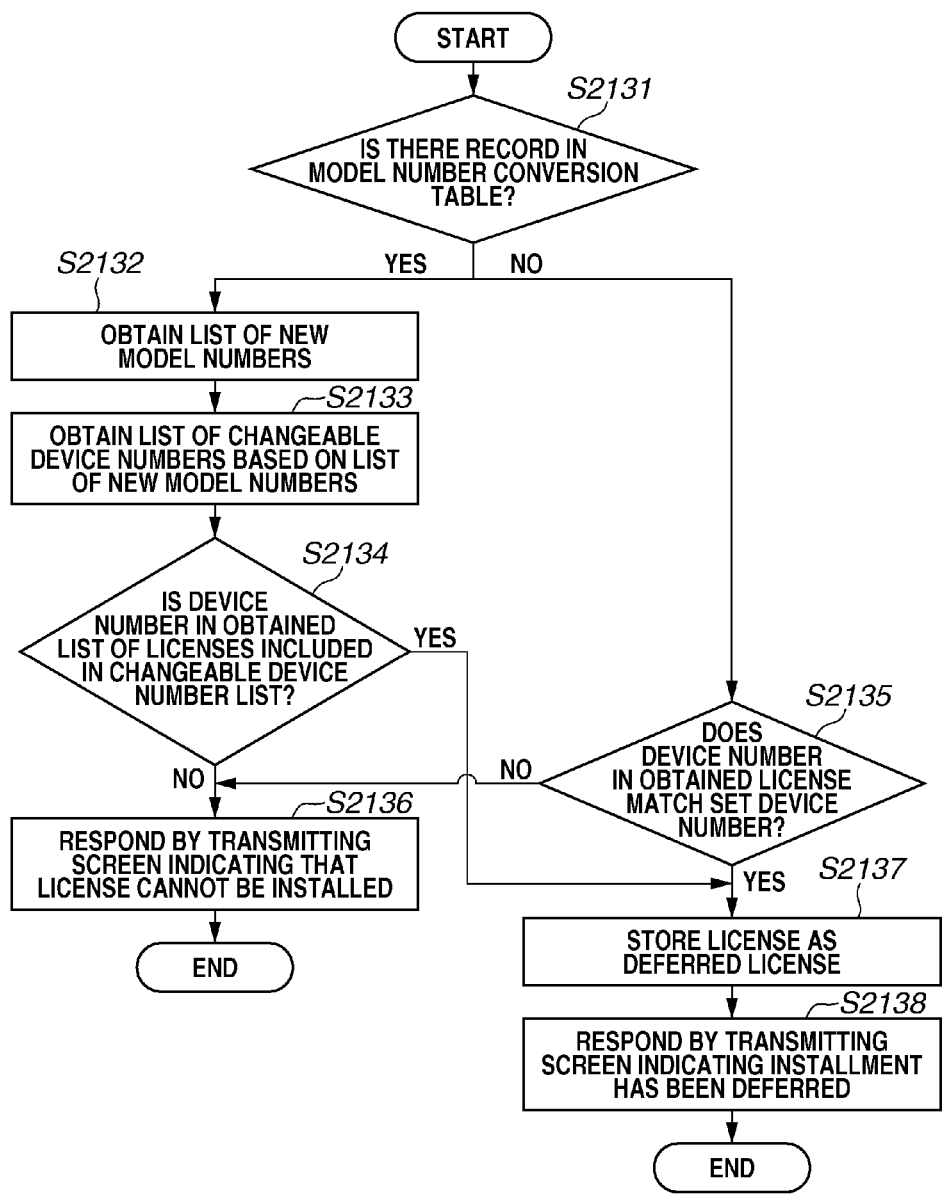

FIG. 21B is a flowchart illustrating the deferred license generation process performed in step S1111 of the flowchart illustrated in FIG. 11B, which is performed instead of the process of the flowchart illustrated in FIG. 11C. In step S2131, the install request receiving unit 352 determines whether there is one or more records in the model number conversion table 1801. If there is one or more records (YES in step S2131), the process proceeds to step S2132. If there is no record (NO in step S2131), the process proceeds to step S2135. In step S2132, the install request receiving unit 352 obtains as a list of the new model numbers, the list of the values stored in the new model number column 1803 of the model number conversion table 1801.

In step S2133, the install request receiving unit 352 obtains the device number from the value in the device number column 412 of the device information table 411. The install request receiving unit 352 then obtains as a list of changeable device numbers, the values obtained by replacing the first three digits of the device number by each of the new model numbers obtained in step S2132. In step S2134, the install request receiving unit 352 determines whether the device number 904 included in the license list 802 obtained in step S1102 is included in the list of changeable device numbers obtained in step S2133. If the device number 904 is included (YES in step S2134), the process proceeds to step S2137. If the device number 904 is not included (NO in step S2134) the process proceeds to step S2136.

On the other hand, in step S2135, the install request receiving unit 352 determines whether the device number 904 included in the license list 802 obtained in step S1102 matches the value in the device number column 412 stored in the device information table 411. If the values do not match (NO in step S2135), the process proceeds to step S2136. If the values match (YES in step S2135), the process proceeds to step S2137. In step S2136, the install request receiving unit 352 responds to the install request 801 by transmitting the screen display indicating that the license cannot be installed.

In step S2137, the install request receiving unit 352 stores in the hard disk 208 of the image forming apparatus 103 the license list 802 received in step S1102. The install request receiving unit 352 then adds to the deferred license table 441 the record which stores in the license column 442 the absolute path of the deferred license. In step S2138, the install request receiving unit 352 responds to the install request 801 by transmitting the screen display indicating that the installment has been deferred.

FIG. 22 is a flowchart illustrating the process performed when the additional license issue request receiving unit 325 receives via the network I/F 226 the additional license issue request 841. The process is performed instead of the process of the flowchart illustrated in FIG. 16.

In step S2201, the additional license issue request receiving unit 325 receives the additional license issue request 841. In step S2202, the additional license issue request receiving unit 325 obtains the license number 842 from the additional license issue request 841 received in step 2201. In step S2203, the additional license issue request receiving unit 325 obtains from the license number information table 511 the product information record which includes as the value in the license number column 512 the license number 842 obtained in step S2202. The additional license issue request receiving unit 325 then determines whether the value in the type column 504 of the obtained product information record is "PPM". If the value is "PPM" (YES in step S2203), the process proceeds to step S2205. If the value is other than "PPM" (NO in step S2203), the process proceeds to step S2204.

In step S2204, the additional license issue request receiving unit 325 displays the error screen indicating that the input license number is not a PPM product. The process then ends. On the other hand, in step S2205, the additional license issue request receiving unit 325 obtains the client identifier 843 from the additional license issue request 841 received in step S2201. The additional license issue request receiving unit 325 then obtains, based on the obtained client identifier 843, the transfer destination device number 832 stored in step S1524. In step S2206, the additional license issue request receiving unit 325 obtains the client identifier 843 from the additional license issue request 841 received in step S2201. The additional license issue request receiving unit 325 then obtains, based on the obtained client identifier 843, the invalidated license list 833 stored in step S1524.

In step S2207, the additional license issue request receiving unit 325 uses the license issuing unit 323 and issues the license based on the license number 842 obtained in step S2202 and the transfer destination device number 832 obtained in step S2205. In step S2208, the additional license issue request receiving unit 325 obtains the value in the function ID column 505 of the product information records obtained in step S2203. In step S2209, the additional license issue request receiving unit 325 obtains the list of the records in which the value in the function ID column 1902 is the function ID obtained in step S2208.

In step S2210, the additional license issue request receiving unit 325 obtains from the list of records obtained in step S2209, the record in which the value in the original model number column 903 is the first three digits of the transfer destination device number 832 obtained in step S2205. In step S2211, the additional license issue request receiving unit 325 determines whether the record has been obtained in step S2210. If the record has been obtained (YES in step S2211), the process proceeds to step S2212. If the record has not been obtained (NO in step S2211), the process proceeds to step S2214.

In step S2212, the additional license issue request receiving unit 325 obtains as the new model number the value in the new model number column 1904 of the records obtained in step S2210. In step S2213, the additional license issue request receiving unit 325 uses the license transfer unit 324 and issues the transfer license based on the invalidated license list obtained in step S2206. The value in which the first three digits of the transfer destination device number obtained in step S2205 has been replaced by the new model number obtained in step S2212 is used as the device number when issuing the license.

In step S2214, the additional license issue request receiving unit 325 uses the license transfer unit 324 and issues the transfer license based on the transfer destination device number 832 obtained in step S2205 and the invalidated license list 833 obtained in step S2206. In step S2215, the additional license issue request receiving unit 325 responds to the license transfer request 831 by transmitting the license issue completion screen 711 for obtaining the license issued in step S2207 and the transfer license issued in step S2213 or step S2214.

As described above, according to the fourth exemplary embodiment, the license management server 101 issues the continuous copying speed setting license based on the input device number. The license management server 101 then generates the new device number according to installment of the continuous copying speed setting license. The license management server 101 issues the license for the extension functions to the newly-generated device number. The user can thus issue and transfer the license without being aware of the change in the device number.

Further, if an input license cannot be installed according to the currently set device number, the license is handled as the deferred license in the case where there is a possibility that the currently set device number will be changed when the continuous copying speed setting license is installed. Conventionally, the license for using the extension functions can only be installed after installing the continuous copying speed setting license and changing the device number. However, according to the present exemplary embodiment, the licenses can be installed without consideration of the order of installment.

The present invention may be realized by supplying to a system or an apparatus via the network or various storage media, software (program code) for implementing the functions of the above-described exemplary embodiments, and the computer (or a CPU or a micro-processing unit (MPU)) reads and executes the program code.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-013321 filed Jan. 28, 2013, which is hereby incorporated by reference herein in its entirety.

What is claimed is:

1. An image forming apparatus comprising:
an installing means configured to install a license for setting a continuous copying speed of the image forming apparatus;
a setting means configured to set as a continuous copying speed of the image forming apparatus, a continuous copying speed specified by the license when the installing means installs the license; and
a control means configured to not permit, in the case where the setting means has not set a continuous copying speed, the image forming apparatus to be activated, and permit, in the case where the setting means has set a continuous copying speed, the image forming apparatus to be activated.

2. The image forming apparatus according to claim 1, wherein the installing means cancels installment of a license for setting a continuous copying speed of the image forming apparatus in the case where a continuous copying speed of the image forming apparatus is previously set when a license for setting a continuous copying speed of the image forming apparatus is installed.

3. The image forming apparatus according to claim 1, wherein the installing means indicates that the input license cannot be installed due to a continuous copying speed set to the image forming apparatus in the case where a continuous copying speed of the image forming apparatus is previously set when a license for setting a continuous copying speed of the image forming apparatus is installed.

4. The image forming apparatus according to claim 1, wherein a license for setting a continuous copying speed of the image forming apparatus is a first license and a license for using extension functions of the image forming apparatus is a second license, and
wherein the installing means installs the second license after the setting means sets a continuous copying speed of the image forming apparatus when the installing means installs the first license.

5. The image forming apparatus according to claim 4, wherein the installing means stores, in the case where the second license has been input before installing the first license, the second license as a deferred license in a memory without installing the first license, and installs the second license after the setting means sets a continuous copying speed of the image forming apparatus when the installing means installs the first license.

6. The image forming apparatus according to claim 4, further comprising a providing means configured to provide a screen for inputting a license,
wherein the installing means installs, when a plurality of licenses input via the screen is received, the first license included in the plurality of licenses, and then installs the second license included in the plurality of licenses after the setting means has set a continuous copying speed of the image forming apparatus when the installing means installs the first license.

7. The image forming apparatus according to claim 4, wherein the installing means installs a license for setting a continuous copying speed of the image forming apparatus, and installs the second license issued in association with the changed device number, after a device number previously set to the image forming apparatus has been changed to a device number corresponding to the continuous copying speed.

8. The image forming apparatus according to claim 1, wherein the license includes license ID for uniquely identifying a license, function ID for uniquely identifying a function, and a device number for uniquely identifying the image forming apparatus.

9. A control method for controlling an image forming apparatus, the method comprising:
a step of installing a license for setting a continuous copying speed of the image forming apparatus;
a step of setting as a continuous copying speed of the image forming apparatus, a continuous copying speed specified by the license when the license is installed;
a step of not permitting, in the case where a continuous copying speed has not been set, the image forming apparatus to be activated; and,
a step of permitting in the case where a continuous copying speed has been set, the image forming apparatus to be activated.

10. The control method according to claim 9, further comprising,
a step of cancelling, in the case where a continuous copying speed of the image forming apparatus is previously set when a license for setting a continuous copying speed of the image forming apparatus is installed, installment of a license for setting a continuous copying speed of the image forming apparatus.

11. The control method according to claim 9, further comprising,
a step of indicating that the input license cannot be installed due to a continuous copying speed set to the image forming apparatus, in the case where a continuous copying speed of the image forming apparatus is previously set when a license for setting a continuous copying speed of the image forming apparatus is installed.

12. The control method according to claim 9, wherein a license for setting a continuous copying speed of the image forming apparatus is a first license and a license for using extension functions of the image forming apparatus is a second license, and
further comprising a step of installing the second license after setting a continuous copying speed of the image forming apparatus when the first license is installed.

13. The control method according to claim 12, further comprising:
a step of storing, in the case where the second license has been input before installing the first license, the second license as a deferred license in a memory without installing the first license; and
a step of installing the second license after a continuous copying speed of the image forming apparatus has been set when the first license is installed.

14. The image forming apparatus according to claim 12, further comprising:
a step of providing a screen for inputting a license; and
a step of installing, when a plurality of licenses input is received via the screen, the first license included in the plurality of licenses, and then a step of installing the second license included in the plurality of licenses after a continuous copying speed of the image forming apparatus has been set when the first license is installed.

15. The control method according to one of claim 12, further comprising:
a step of installing a license for setting a continuous copying speed of the image forming apparatus; and
a step of installing the second license issued in association with the changed device number, after a device number previously set to the image forming apparatus has been changed to a device number corresponding to the continuous copying speed.

16. An image forming apparatus comprising:
an installing means configured to install a license for setting a continuous copying speed of the image forming apparatus; and
a setting means configured to set as a continuous copying speed of the image forming apparatus, a continuous copying speed specified by the license when the installing unit installs the license.

* * * * *